(12) United States Patent  
Saito

(10) Patent No.: US 9,279,926 B2  
(45) Date of Patent: Mar. 8, 2016

(54) INFRARED SHIELDING FILM

(71) Applicant: Konica Minolta, Inc., Tokyo (JP)

(72) Inventor: Makiko Saito, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/360,502

(22) PCT Filed: Nov. 16, 2012

(86) PCT No.: PCT/JP2012/079833  
§ 371 (c)(1),  
(2) Date: May 23, 2014

(87) PCT Pub. No.: WO2013/077274  
PCT Pub. Date: May 30, 2013

(65) Prior Publication Data  
US 2014/0340740 A1    Nov. 20, 2014

(30) Foreign Application Priority Data

Nov. 24, 2011  (JP) ................................ 2011-256310

(51) Int. Cl.  
 G02B 5/28   (2006.01)  
 F21V 9/04   (2006.01)  
 G02B 5/26   (2006.01)

(52) U.S. Cl.  
CPC ...... *G02B 5/281* (2013.01); *G02B 5/26* (2013.01); *G02B 5/282* (2013.01)

(58) Field of Classification Search  
None  
See application file for complete search history.

(56) References Cited

U.S. PATENT DOCUMENTS

| 3,423,147 | A  | 10/1963 | Thelen |
| 2009/0025783 | A1 | 1/2009 | Wernham |

(Continued)

FOREIGN PATENT DOCUMENTS

| EP | 1573371 | 9/2005 |
| JP | 2003-121602 A | 4/2003 |
| JP | 2006-511838 A | 4/2006 |

(Continued)

OTHER PUBLICATIONS

English Machine Translation of Yamakawa et al., JP 2009-086659 A.*

(Continued)

*Primary Examiner* — Derek S Chapel  
(74) *Attorney, Agent, or Firm* — Lucas & Mercanti, LLP

(57) ABSTRACT

The infrared shielding film has at least one unit formed by stacking a high-refractive-index layer and a low-refractive-index layer, the layers containing a high-refractive-index material and a low-refractive-index material, respectively. The high-refractive-index layer and the low-refractive-index layer each contains at least one polymer. The infrared shielding film has a mixed region containing the high-refractive-index material and the low-refractive-index material between the high-refractive-index layer and the low-refractive-index layer. The mixing ratio of the high-refractive-index material and the low-refractive-index material continuously changes in the mixed region. The infrared shielding film satisfies a following formula (1) in a visible light wavelength region and at light incident angles of 0°, 40° and 80°: $0.01 \leq \sigma/\Delta Av \leq 0.12$ (1), wherein $\sigma$ represents a variation in reflectivity, and $\Delta Av$ represents an amount of variation in average reflectivity.

7 Claims, 4 Drawing Sheets

(56) References Cited

U.S. PATENT DOCUMENTS

2010/0177380 A1     7/2010    Nagahama
2011/0026121 A1     2/2011    Suzuki et al.

FOREIGN PATENT DOCUMENTS

| | | |
|---|---|---|
| JP | 2009-086659 A | 4/2009 |
| JP | 2009086659 | 4/2009 |
| JP | 2010-231224 A | 10/2010 |

OTHER PUBLICATIONS

PCT/JP2012/079833 International Preliminary Report on Patentability and Written Opinion in English and Japanese, date of issuance May 27, 2014 (11 pages).

Extended European Search Report dated Jun. 9, 2015 from the corresponding European Patent Application No. 12851595.4.

* cited by examiner

INFRARED SHIELDING FILM

CROSS REFERENCE TO RELATED APPLICATION

This Application is a 371 of PCT/JP2012/079833 filed on Nov. 16, 2012 which, in turn, claimed the priority of Japanese Patent Application No. JP2011-256310 filed on Nov. 24, 2011 both applications are incorporated herein by reference.

TECHNICAL FIELD

The present invention relates to an infrared shielding film formed by alternately stacking layers having different refractive indices. More specifically, the present invention relates to an infrared shielding film, which is produced at low costs and in which the reflection unevenness due to the variation in incident angles and film thickness is decreased.

BACKGROUND ART

It has been known that, in a film in which layers having different refractive indices are alternately stacked, the film can be designed so as to reflect the regions from visible light to infrared ray by adjusting the optical film thickness.

Patent Literature 1 discloses that, using an alternately-stacked unit formed of a high-refractive-index layer A (refractive index: nA) and a low-refractive-index layer C (refractive index: nC), an infrared reflective film suppressing reflectivity unevenness in the visible right region can be attained by forming an alternately-stacked unit by alternately stacking a layer B having a different refractive index to satisfy a relationship in refractive indices of nB=√nAnC, together with the above-mentioned high-refractive-index layer A and low-refractive-index layer C, in the order of ABCB, and further presetting the ratio of the optical film thicknesses of the respective layers so as to be A 1/3, B 1/6 and C 1/3.

However, the above-mentioned constitution is designed in light of the performance for vertically-entered light beam, and significant reflectivity unevenness generates for beams with large incident angles. This also shows that the performance significantly decreases in the variation in the layer film thickness, which occurs during the production. Since it is necessary to stack three kinds of materials in sequence, the cost is higher than that of an alternately-stacked film having a two-layer constitution.

As materials having different refractive indices, inorganic materials have been conventionally used. Therefore, in order to form thin layers having different refractive indices, a deposition process in which such inorganic materials are deposited by physical deposition or chemical deposition is used. However, in these deposition processes, the apparatuses are huge and the formation of thin films requires high costs. These processes are not suitable for the formation of thin films having large surface areas. Therefore, an optical film to which a production process such as an application process that can form thin layers with large surface areas at lower costs without using a deposition process, can be applied is required.

CITATION LIST

Patent Literature

Patent Literature 1: U.S. Pat. No. 3,423,147

SUMMARY OF INVENTION

Technical Problem

Accordingly, the present invention solves the above-mentioned problems of the prior art, and the object of the present invention is to obtain an infrared shielding film, which is produced at low costs, which can enlarge the surface area, which suppresses visible color unevenness by reducing the reflectivity unevenness in the visible light region, and which has highly robust optical reflection characteristics with respect to the variation in film thickness.

Solution to Problem

The above-mentioned problems of the present invention are achieved by the following means.

Specifically, the present invention provides an infrared shielding film having at least one unit formed by stacking a high-refractive-index layer and a low-refractive-index layer, the layers containing a high-refractive-index material and a low-refractive-index material, respectively, the materials having different refractive indices with each other,
wherein
the high-refractive-index layer and the low-refractive-index layer each contains at least one polymer,
the infrared shielding film has a mixed region containing the high-refractive-index material and the low-refractive-index material between the high-refractive-index layer and the low-refractive-index layer,
a mixing ratio of the high-refractive-index material and the low-refractive-index material continuously changes in the mixed region, and
the infrared shielding film satisfies a following formula (I) in a visible light wavelength region and at light incident angles of 0°, 40° and 80°:

$$0.01 \leq \sigma/\Delta Av \leq 0.12 \tag{1}$$

wherein σ represents a variation in reflectivity, and ΔAv represents an amount of variation in average reflectivity.

It is preferable that in the infrared shielding film, the at least one unit mainly reflects near infrared light.

It is preferable that the infrared shielding film further has an infrared absorbing layer or an infrared reflective layer.

It is preferable that a difference between a refractive index of the high-refractive-index layer and a refractive index of the low-refractive-index layer Δn is 0.05 to 0.65 in the infrared shielding film.

It is preferable that in the infrared shielding film, at least one of the polymers is a water-soluble polymer, and at least one of the high-refractive-index layer and the low-refractive-index layer containing the water-soluble polymer further contains metal oxide particles.

Advantageous Effects of Invention

According to the present invention, an infrared shielding film, which is produced at low costs, which can enlarge the surface area can be enlarged, which suppresses visible color unevenness by reducing the reflectivity unevenness in the visible light region, and which has highly robust optical reflection characteristics with respect to the variation in film thickness, can be obtained.

DESCRIPTION OF EMBODIMENTS

Figure 1:
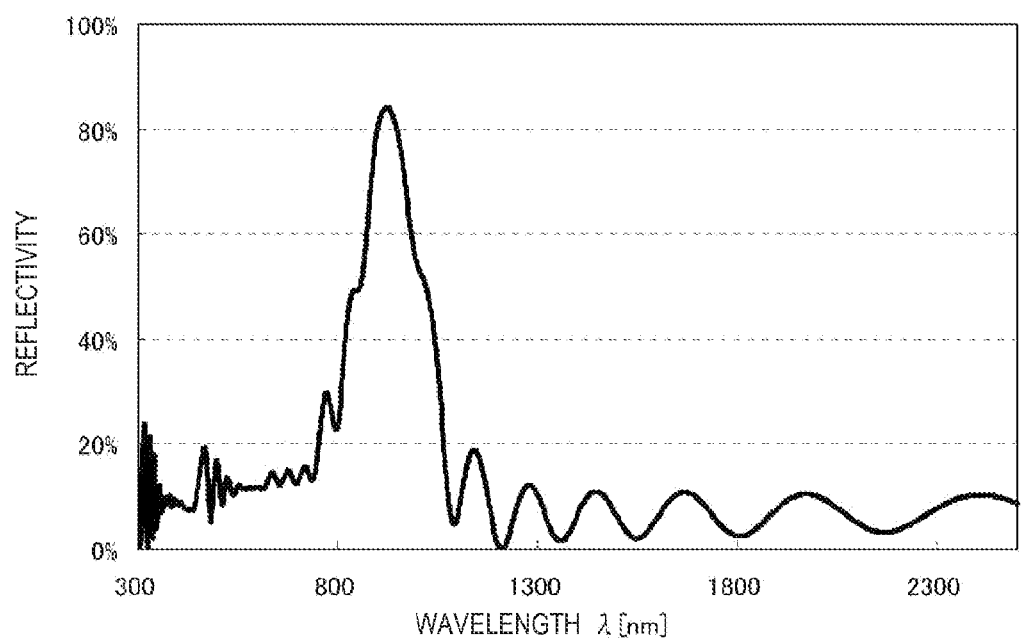
FIG. 1 is a drawing showing the reflection characteristic of the infrared shielding film of Example 1.

The present invention will be explained below in detail. The infrared shielding film of the present invention includes a high-refractive-index layer and a low-refractive-index layer, and a mixed region that is present between those layers, as a basic constitution, and preferably further includes an infrared absorbing layer or an infrared reflective layer and a film substrate. The major feature in the present invention is that the infrared shielding film is constituted by disposing the mixed region between the high-refractive-index layer and the low-refractive-index layer so that the entirety of the infrared shielding film satisfies a specific relational formula. The feature of the present invention will be explained below by dividing the present invention into the constitutional elements.

[Mixed Region]

The mixed region as referred to in the present invention is a region that is present between the high-refractive-index layer containing the high-refractive-index material and the low-refractive-index layer containing the low-refractive-index material and in the region, the both materials are present and the mixing ratio continuously changes. It is sufficient for the mixing ratio to continuously change that the ratio of the high-refractive-index material and low-refractive-index material change with a constant tendency to the some extent, and that the concentration of the high-refractive-index material is high at the high-refractive-index layer side of the mixed region and the concentration of the low-refractive-index material is high at the low-refractive-index layer side. Therefore, in the present invention, the region where both of the high-refractive-index material and low-refractive-index material are lower than 80% by mass is referred to as a mixed region. The region where the concentration of the high-refractive-index material accounts for 80% or more is referred to as a high-refractive-index layer, and the region where the concentration of the low-refractive-index material accounts for 80% or more is referred to as a low-refractive-index layer.

A set of the high-refractive-index layer and the low-refractive-index layer is also referred to as a stacking unit. It is preferable to stack this unit in a plural number so as to produce an infrared shielding film. In this case, it is preferable that the high-refractive-index layers and low-refractive-index layers are alternately stacked, for example, as in a high-refractive-index layer, a mixed region, a low-refractive-index layer, a mixed region, a high-refractive-index layer, a mixed region . . . (an alternately-stacked body), and that the mixed region is present between the high-refractive-index layer and low-refractive-index layer.

It is known that it is possible to design a film so as to reflect light from the visible light region to the infrared ray region by adjusting an optical film thickness by alternately stacking layers having different refractive indices. However, in some cases, a film having a reflection characteristic that is not desired is formed by only alternately stacking layers having different refractive indices, because, high-order of reflection arises on a wavelength region other than the wavelength regions where reflection is desired.

As a process for preventing this, for example, in the case where an infrared reflective film is constituted by an alternately-stacked unit including a high-refractive-index layer A (refractive index: nA) and a low-refractive-index layer C (refractive index: nC) as mentioned above, it is known that a stacked body of a polymer film having an alternately-stacked unit formed by alternately stacking, together with the above-mentioned high-refractive-index layer A and low-refractive-index layer C, a layer B having a different refractive index which have the relationship of the refractive indices of nB=√nAnC, in the order of ABCB, and further presetting the ratio of the optical film thicknesses of the respective layers to be A 1/3, B 1/6 and C 1/3.

The present invention basically has such constitution, but is characterized in that a mixed region in which the constitutional materials of the respective layers are mixed and the mixing ratio thereof continuously changes in the film thickness direction is disposed between the high-refractive-index layer and the low-refractive-index layer.

Namely, when an alternate stack is formed by using an application liquid A for the high-refractive-index layer (refractive index: nA) and an application liquid C for the low-refractive-index layer (refractive index: nC), a mixed region where the refractive index continuously change such that the refractive index has the relationship of approximately nB=√nAnC in average (this corresponds to the above-mentioned layer B), can be formed in the region in which the respective layers are mixed. In the present invention, the mixed region is a region that substitutes for the above-mentioned layer B, and plays a role of the layer B and provides an additional effect. The mixed region has a thickness of preferably 60 to 200 nm, more preferably 100 to 140 nm. In this range, the desired effect of the present invention is attained more surely.

In the mixed region of the present invention, it is preferable that the profile of the refractive index in the film thickness direction has a following profile in the structure in which the high-refractive-index material and low-refractive-index material are mixed and the refractive index changes alternately and continuously. Namely, in the case where the largest refractive index−smallest refractive index=Δn, it is preferable to have a continuous refractive index profile so that the position where the refractive index becomes the largest refractive index−Δn/3 with respect to the largest refractive index, is within the range from the largest refractive index point to 0.9/3 to 1.1/3 with respect to the width from the largest refractive index to the smallest refractive index (layer thickness), and that, for the smallest refractive index, the position where the smallest refractive index+Δn/3 is in the range from the smallest refractive index point to 0.9/3 to 1.1/3 with respect to the width from the largest refractive index to the smallest refractive index (layer thickness).

By providing such continuous change in the refractive index, the present invention has a characteristic that corresponds to the above-mentioned alternately stacking structure of ABCB in which the layer B is introduced. Furthermore, since the refractive index changes continuously and smoothly rather than stepwise, the reflection of the side band regions that are close to the reflection wavelength region of the major reflection band can also be suppressed. In addition, even the film thickness changes in the production process or due to deterioration over time, an optical reflection film having highly robust optical reflection characteristics can be obtained. In the present invention, it is preferable that the refractive index profile shows a sine curve.

Therefore, as mentioned above, the infrared shielding film of the present invention is not one in which the layer B that has an intermediate refractive index having a relationship of approximately nB=√nAnC with the high-refractive-index layer A and low-refractive-index layer C is stacked together with the above-mentioned high-refractive-index layer A and low-refractive-index layer C in the order of ABCB in such a manner that the respective layers are stacked clearly and alternately. But, the presented film is an alternately-stacked body having a structure in which the refractive index continuously changes from the high-refractive-index layer (highly-refractive region) to the lowly-refractive layer (lowly-refractive region) in the mixed region thereof, for example, by simultaneously stacking or multi-layer extrusion molding the application liquid for the high-refractive-index layer and the application liquid for the low-refractive-index layer. In the present invention, the state in which the refractive index continuously changes can be confirmed by observing the composition concentration profile mentioned below.

In the refractive index profile in the film thickness direction, when the width from the largest refractive index to the smallest refractive index (layer thickness) is referred to T, and when the inside of the width (layer thickness) T is divided into every T/4 and the minimum value of the difference of the refractive indices in an arbitrary interval of T/4 is referred to ΔS, it is desirable that (Δn/16)≤ΔS ≤(Δn/2) is satisfied. Herein, Δn is a difference between the largest refractive index and smallest refractive index. In an alternately-stacked body having continuous refractive indices, ΔS has a difference in refractive indices that is equal to or more than a predetermined value (Δn/16). When the difference is Δn/2 in all of the intervals of T/4, the refractive index linearly changes.

Accordingly, by adopting an alternately-stacked body having the constitution in which the refractive index continuously changes, the reflection unevenness in the visible light wavelength region can be suppressed. Since the mixed region where the materials of the high-refractive-index layer and low-refractive-index layer are mixed and the mixing ratio continuously changes is present between the two layers, a clear boundary of the layers is eliminated, and thus failures that easily arise on a laminar boundary such as delamination can be decreased. Therefore, the yield ratio during the production is improved, and at the same time, deterioration over time due to these failures is difficult to occur, as compared to the alternately-stacked body in which respective layers are stacked clearly and alternately as in the above-mentioned prior art.

The constitution according to the present invention provides an infrared shielding film, which has fine producibility, can be produced so as to have a large surface area, has highly robust optical reflection characteristics even the film thickness varies, and is especially excellent in the optical characteristics in the visible light region, where a thin film thickness of about several ten to several hundred nanometers is required and the infrared shielding film is easily affected by the variation in film thickness.

In the infrared shielding film of the present invention, the above-mentioned refractive index profile can be found by observing the composition concentration profile. For example, the high-refractive-index layer contains titanium oxide as the high-refractive-index material, and the low-refractive-index layer contains silicon oxide as the low-refractive-index material, and the metal oxide concentration profiles in the film thickness direction in these stacked films can be measured and converted into the refractive index by the composition thereof. The metal oxide concentration profile of the stacked film can be observed by etching from the surface in the depth direction by a sputtering process. The film is sputtered at a velocity of 0.5 nm/min with setting the uppermost surface as 0 nm, and also, the atomic composition ratio is measured by an XPS surface analyzer. Also in a stacked body having a high-refractive-index material or low-refractive-index material that does not contain a metal oxide and is formed of only polymer material, it is possible to confirm the presence of a mixed region by, for example, measuring the carbon concentration in the film thickness direction in a similar composition concentration profile, and to further convert the composition distribution thereof into a refractive index profile.

Although the XPS surface analyzer is not especially limited and every model can be used, ESCALAB-200R manufactured by VG Scientific Ltd. was used. Mg is used in an X-ray anode, and a measurement is conducted at an output of 600 W (acceleration voltage: 15 kV, emission current: 40 mA).

Furthermore, the present invention is characterized in that the σ/ΔAv at light incident angles of 0°, 40° and 80° in the visible light wavelength region of wavelengths from 400 nm to 700 nm satisfies the relational formula (1) by disposing the above-mentioned mixed region:

$$0.01 \leq \sigma/\Delta Av \leq 0.12 \quad (1)$$

More preferably, $0.02 \leq \sigma/\Delta Av \leq 0.1$.

In the formula, σ represents the variation in reflectivity, and is obtained by $$\sigma = \sqrt{[\{(r1-Av)^2 + (r2-Av)^2 + \ldots + (rn-Av)^2\}/n]} \quad (2).$$

In this formula, the visible light wavelength region is divided into n (=151), and the reflectivities at the respective wavelengths are deemed as r1, r2, ..., rn.

Av represents the average value of the visible light reflectivities, and $$Av = (r1 + r2 + \ldots + rn)/n \quad (3).$$

Furthermore, ΔAv represents the amount of variation in average reflectivity, and is obtained as $$\Delta Av = Av80 - Av0 \quad (4).$$

In this formula, Av80 represents Av when the light incident angle is 80°, and Av0 represents Av when the light incident angle is 0°.

In the present invention, by satisfying the formula (1), a film that does not have any reflection peaks that are characteristic to the visible light wavelength region and thus color unevenness does not arise in the plane even when the film is seen from every angle, is formed. This can be attained by forming a mixed region in which the constitutional materials of the respective high-refractive-index layer and low-refractive-index layer are mixed and the mixing ratio thereof continuously changes in the film thickness direction between the layers, and by selecting such Δn and film thicknesses of the respective layers that exhibit desired performances. The processes for selecting the Δn and film thicknesses of the respective layers are based on well-known theories on thin film interference (Snell's law of refraction, Young's principle of light interference, Maxwell's principles of electromagnetism, matrix method and the like) and will be explained in detail in the following section [Designing of Film].

[Designing of Film]

In the present invention, the difference in refractive indices Δn between the high-refractive-index layer and low-refractive-index layer is preferably 0.05 or more, more preferably 0.15 or more. The upper limit is not especially limited, but it is desirably 0.65 or less. In the case where Δn is smaller than 0.05, it is not desirable in view of costs because a large number of layers are required so as to express a reflection performance and the production steps are increased. When the Δn is larger than 0.65, the reflectivity can be earned by a small number of layers and thus the reflection performance is improved, but high-order reflection that arises in a wavelength region other than the wavelength region for which reflection is desired also increases at the same time, and this is undesirable because unevenness of the performances arises, especially the change in the performances with respect to the variation in film thickness increases.

Δn is obtained from the difference in the refractive indices of the high-refractive-index material that constitutes the high-refractive-index layer and the low-refractive-index material that constitutes the low-refractive-index layer. But, the refractive index cannot be determined in an actual stacking state due to that plural materials are mixed, and the like. Therefore, in the present invention, the high-refractive-index material or the low-refractive-index material is applied as a single layer on a substrate having a known refractive index to prepare a film body for the measurement of refractive index, the spectroscopic reflectivity of the film body is measured by a spectrometer, and the refractive index is calculated by running the spectroscopic reflectivity with a simulated value. Although the film thickness of the single film is not especially limited, when the film thickness is too thin, unevenness in the film thickness, measurement noise and the like is likely to affect the measurement. Therefore, it is desirable to make the film thickness about 1 μm.

Although the infrared shielding film of the present invention has the mixed region at the boundary of the high-refractive-index layer and low-refractive-index layer, the infrared shielding film is prepared by simultaneously superposing the high-refractive-index material and low-refractive-index material together with the mixed region as mentioned below. Therefore, the infrared shielding film is explained to have two layers for descriptive purposes, and the term "layer" is not used to indicate a layer having a clear boundary. It is sufficient that the infrared shielding film of the present invention has at least one unit having a high-refractive-index layer, a mixed region and a low-refractive-index layer in this order, and a plural number of intermediate refractive index layers having an intermediate refractive index may be interposed besides the high-refractive-index layer and low-refractive-index layer.

In the following explanation, the explanation will be made by omitting the mixed region for descriptive purposes, deeming the high-refractive-index layer and low-refractive-index layer that are adjacent through the mixed region as adjacent two layers for descriptive purposes, and by referring to a structure in which a combination of these two layers is stacked as a stacked body.

Since reflection at the boundary of adjacent layers depends on the ratio of the refractive indices between the layers, the reflectivity increases more as the ratio of the refractive indices increases. For a single layer film, when the optical path difference of the reflection light on the layer surface and the reflection light on the bottom of the layer is set to have a relationship represented by n·d=wavelength/4, a phase difference can control the reflection light to enhance each other, and thus the reflectivity can be increased. Here, n is refractive index, and d is physical film thickness of the layer, and n·d is optical film thickness. By utilizing this optical path difference, the reflection can be controlled. After the reflection center wavelength is preset, the reflection of visible light and near infrared light is controlled by controlling the refractive indices and film thicknesses of the respective layers by this relationship. Namely, the reflectivity in specific wavelength regions is increased by the refractive indices of the respective layers, the film thicknesses of the respective layers, and the mode of stacking of the respective layers.

In the optical reflection film of the present invention, the refractive index of the high-refractive-index layer is preferably 1.60 to 2.50, more preferably 1.70 to 2.20. The refractive index of the low-refractive-index layer is preferably 1.10 to 1.66, more preferably 1.30 to 1.65.

In the infrared shielding film of the present invention, the unit in which the high-refractive-index layer and low-refractive-index layer are stacked can reflect effectively and mainly near infrared light by the constitution of the mixed region as mentioned above. The main reflection means that at least 60% of near infrared light is reflected.

The visible light reflectivity can be measured by attaching a 5° reflection unit to a spectrometer (Type U-4000 manufactured by Hitachi, Ltd.) and setting the plane of the optical reflection layer as a measurement plane. The visible light average reflectivity Av can be calculated by, for example, measuring the reflectivities at 151 points at intervals of 2 nm in the region of 400 to 700 nm, and dividing the value of the sum of the all obtained reflectivities by 151. The variation of reflectivity σ is obtained by calculating the differences of the reflectivities of the respective points and the average reflectivity Av, then calculating the squares of these differences and summing all of the squares, dividing the sum with 151, and calculating the square root.

In the infrared shielding film of the present invention, the high-refractive-index layer has a film thickness of preferably 5 to 320 nm, more preferably 15 to 200 nm. The low-refractive-index layer has a film thickness of preferably 5 to 350 nm, more preferably 15 to 220 nm.

In the stacked body of the present invention, further a thick layer having a film thickness of 600 nm to 1200 nm can be preferably used as any one of the layers. This thick layer has the following effects: (1) the wavelength region to be reflected can be broaden, (2) when used in the layer adjacent to the substrate, adhesion to the substrate can be improved, and (3) the thick film exerts a function of stress relaxation, thereby the physical properties of a film with stacked films can be improved. More preferably, the film thickness is 700 nm or more to 1000 nm.

In the present invention, a plurality of stacking units can be used. By modifying the optical film thickness in every unit, the present invention has effects such as those mentioned below and thus is useful: (1) the wavelength region for reflection can be broaden, (2) the edge of the band can be made precipitous, (3) ripple can be decreased, (4) high-order reflection can be suppressed, (5) band shift can be decreased by a change in incident angles, and (6) change in the optical reflection characteristics due to the difference in polarized light can be suppressed, and the like. Especially in (1), by stacking a visible light reflection unit and a near infrared light reflection unit, an infrared shielding film can be formed by entire reflection mode without using a light absorber, and thus the production costs can be decreased, and the advantage in preventing thermal cracking is high because heat is not absorbed.

[Polymer]

The present invention has a layer constitution that has at least one unit formed by alternately stacking, through a mixed region, a high-refractive-index layer and low-refractive-index layer having different refractive indices with each other, each of which contains at least one polymer. As processes to form a thin film, dry processes such as vacuum deposition and sputtering are well-known, but it is difficult to homogeneously form a film on a large surface area due to the principles and constitutions of apparatuses thereof. Since the film formation rate is very slow, the production costs are high, and thus the processes are not suitable for mass production. In addition, in many cases, heat-resistance is required for a substrate on which a film is to be formed. For example, a resin substrate has high heat expansion and shrink coefficient, the film was peeled off therefrom or unevenness arose thereon in some cases due to the stress by the difference in shrinkage ratios of the substrate and deposited film during the decreasing from the deposition temperature to room temperature.

On the other hand, if the high-refractive-index layer and low-refractive-index layer are formed by polymer materials, it is possible to select film formation processes such as application and spin coating. These processes are convenient, and the heat-resistance of the substrate is not questioned. Therefore, these can be film formation processes that have a wide variety of choices and are especially effective for resin substrates. For example, by application, mass production systems such as a roll-to-roll process can be adopted, and thus the process is advantageous in either costs or processing time. In the case of multiple layer application, the high-refractive-index material and low-refractive-index material are gradually mixed over time at the boundary of layers, and thus a mixed region in which the respective materials are continuously mixed can be conveniently obtained.

Since a film formed by deposition or sputtering generally is hard, in the case where the film is formed on a soft substrate, cracking, scratches and the like may be formed on bent portions and the like. On the other hand, a film containing a polymer material is highly flexible, and thus has an advantage that these defects are unlikely to arise even the film is wound during the production or transportation, and thus the film is excellent in handling.

For the above-mentioned reasons, the infrared shielding film of the present invention is constituted such that the high-refractive-index layer and low-refractive-index layer are each constituted by containing at least one polymer.

The polymer that constitutes the high-refractive-index layer or low-refractive-index layer include, as a first polymer, polymers that can show a high refractive index and a low refractive index by a combination of only polymers, and, as a second polymer, a water-soluble polymer that is used in combination with metal oxide particles that show a high refractive index or a low refractive index. In the case of the second polymer, a polymer may be commonly included in the high-refractive-index layer and low-refractive-index layer.

(First Polymer)

It is desirable to select, as the first polymer, a preferable combination in which two polymer materials having different refractive indices with each other have similar fluidity (for example, melt viscosity and the like), and a combination that simultaneously stacking application or multi-layer extrusion can be conducted.

Examples of the first polymer include polyethylene naphthalate (PEN) and isomers thereof (for example, 2,6-, 1,4-, 1,5-, 2,7- and 2,3-PENs), polyalkylene telephthalates (for example, polyethylene telephthalate, polybutylene telephthalate and poly-1,4-cyclohexanedimethylene telephthalate), polyimides (for example, polyacrylic acid imide), polyetherimide, atactic polystyrene, polycarbonate, polymethacrylates (for example, polyisobutyl methacrylate, polypropyl methacrylate, polyethyl methacrylate and polymethyl methacrylate), polyacrylates (for example, polybutyl acrylate and polymethyl acrylate), syndiotactic polystyrene (sPS), syndiotactic poly-α-methylstyrene, syndiotactic polydichlorostyrene, copolymers and blends formed of these arbitrary polystyrenes, cellulose dielectric conductors (for example, ethyl cellulose, cellulose acetate, cellulose propionate, cellulose acetate butyrate and nitrocellulose), polyalkylene polymers (for example, polyethylene, polypropylene, polybutylene, polyisobutylene and poly(4-methyl)pentene), fluorinated polymers (for example, perfluoroalkoxy resins, polytetrafluoroethylene, fluorinated ethylene-propylene copolymer, polyvinylidene fluoride and polychlorotrifluoroethylene), chlorinated polymers (for example, polyvinylidene chloride and polyvinyl chloride), polysulfone, polyethersulfone, polyacrylonitrile, polyamides, silicone resins, epoxy resins, polyvinyl acetate, polyetheramide, ionomer resins, elastomers (for example, polybutadiene, polyisoprene and neoprene) and polyurethane and the like. Copolymers of PENs (for example, copolymers of 2,6-, 1,4-, 1,5-, 2,7- and/or 2,3-naphthalene-dicarboxylic acid(s) or ester (s) thereof with (a) telephthalic acid or esters thereof, (b) isophthalic acid or esters thereof (c) phthalic acid or esters thereof (d) alkane glycols, (e) cycloalkane glycols (for example, cyclohexanedimethanoldiol), (f) alkanedicarboxylic acids, and/or (g) cycloalkanedicarboxylic acids (for example, cyclohexanedicarboxylic acid)), copolymers of polyalkylene telephthalates (for example, copolymers of telephthalic acid or esters thereof with (a) naphthalenedicarboxylic acid or esters thereof, (b) isophthalic acid or esters thereof, (c) phthalic acid or esters thereof, (d) alkane glycols, (e) cycloalkane glycols (for example, cyclohexanedimethanoldiol), (f) alkanedicarboxylic acids, and/or (g) cycloalkanedicarboxylic acids (for example, cyclohexanedicarboxylic acid)), styrene copolymers (for example, styrene-butadiene copolymer and styrene-acrylonitrile copolymer), and a copolymer of 4,4'-dibenzoic acid and ethylene glycol, and the like can also be utilized. Individual layer may contain a blend of two or more of the above-mentioned polymers or copolymers (for example, a blend of sPS and atactic polystyrene).

Among the polymers mentioned above, combinations of polyalkylene telephthalates and polyethylene naphthalate as the high-refractive-index material and polymethacrylates and a copolymer of polyethylene naphthalate as the low-refractive-index material are preferable, because they are more suitable for simultaneous multi-layer application and are materials that show preferable refractive indices as an infrared shielding film. More preferable is a combination of polyethylene telephthalate as the high-refractive-index material and polymethyl methacrylate as the low-refractive-index material.

In the high-refractive-index layer and low-refractive-index layer, the content of the first polymer is 40 to 100% by mass, more preferably 60 to 97% by mass in either layer.

(Second Polymer)

For the high-refractive-index layer and low-refractive-index layer of the infrared shielding film of the present invention, only the above-mentioned first polymer may be used as the high-refractive-index material and low-refractive-index material, or the layers may be constituted by combining a metal oxide that shows a high refractive index or a low refractive index and second polymer. The second polymer is a water-soluble polymer, and a polymer that is common in the high-refractive-index layer and low-refractive-index layer may also be used.

In general, in an alternately-stacked body that is constituted by selecting from the above-mentioned first polymer materials, the difference in refractive indices between the high-refractive-index layer and low-refractive-index layer is not so significant in some cases. In such cases, in order to obtain a reflection performance that exerts a heat shield effect, a large number of stacking such as 100 or more layers is required. On the other hand, when the second polymer is used as a polymer material together with metal oxide particles, it is preferable because the refractive index can be improved, and the number of stacking of the infrared shielding film can be decreased.

Examples of the second polymer that can be applied to the present invention, i.e., water-soluble polymer, may include polyvinyl alcohols, polyvinyl pyrrolidones, acrylic-based resins such as polyacrylic acid, acrylic acid-acrylonitrile copolymers, potassium acrylate-acrylonitrile copolymers, vinyl acetate-acrylic acid ester copolymers, or acrylic acid-acrylic acid ester copolymer, styrene acrylic acid resins such as styrene-acrylic acid copolymer, styrene-methacrylic acid copolymer, styrene-methacrylic acid-acrylic acid ester copolymer, styrene-α-methylstyrene-acrylic acid copolymer or styrene-α-methylstyrene-acrylic acid-acrylic acid ester copolymers, styrene-sodium styrene sulfonate copolymer, styrene-2-hydroxyethyl acrylate copolymer, styrene-2-hydroxyethyl acrylate-potassium styrene sulfonate copolymer, styrene-maleic acid copolymer, styrene-maleic anhydride copolymer, vinylnaphthalene-acrylic acid copolymer, vinylnaphthalene-maleic acid copolymer, vinyl acetate-based copolymers such as vinyl acetate-maleic acid ester copolymer, vinyl acetate-crotonic acid copolymer and vinyl acetate-acrylic acid copolymer and salts thereof, gelatin, and the following polysaccharide thickeners. Among these, especially preferable examples may include polyvinyl alcohol, gelatin, polyvinyl pyrrolidones and copolymers containing them. These water-soluble polymers may be used alone or by mixing two or more kinds. Examples of commercially available products of polyvinyl alcohol may include PVA103 and PVA235 manufactured by Kuraray Co., Ltd., and examples of commercially available products of gelatin may include HBC-P20 manufactured by Nitta Gelatin Inc. and AP-270 manufactured by Nippi Inc.

The preferable content of the water-soluble polymer is preferably 20 to 80% by volume, more preferably 30 to 70% by volume in the high-refractive-index layer, and is preferably 20 to 80% by volume, more preferably 30 to 70% by volume in the low-refractive-index layer.

The weight average molecular weight of the water-soluble polymer is preferably 1,000 or more and 200,000 or less. It is more preferably 3,000 or more and 40,000 or less.

The polyvinyl alcohol that is preferably used in the present invention also includes, besides general polyvinyl alcohols that are obtained by hydrolyzing polyvinyl acetate, modified polyvinyl alcohols such as polyvinyl alcohols in which terminals thereof have been cation-modified and anion-modified polyvinyl alcohols having anionic groups.

As the polyvinyl alcohols obtained by hydrolyzing vinyl acetate, those having an average polymerization degree of 100 or more are preferably used, and those having an average polymerization degree of 200 to 5,000 are especially preferably used. Those having a saponification degree of 70 to 100 mol % are preferable, and those having a saponification degree of 80 to 99.5 mol % are especially preferable.

Examples of the cation-modified polyvinyl alcohols are polyvinyl alcohols having primary to tertiary amino groups or a quaternary ammonium group in the main chain or side chains of the above-mentioned polyvinyl alcohols, as those described in Japanese Patent Application Laid-Open No. 61-10483, and these can be obtained by saponifying a copolymer of an ethylenically unsaturated monomer having a cationic group and vinyl acetate.

Examples of the ethylenic unsaturated monomer having a cationic group may include trimethyl-(2-acrylamide-2,2-dimethylethyl) ammonium chloride, trimethyl-(3-acrylamide-3,3-dimethylpropyl) ammonium chloride, N-vinylimidazole, N-vinyl-2-methylimidazole, N-(3-dimethylaminopropyl) methacrylamide, hydroxylethyltrimethylammonium chloride, trimethyl-(2-methacrylamidepropyl) ammonium chloride, N-(1,1-dimethyl-3-dimethylaminopropyl)acrylamide and the like. The ratio of the cation-modified group-containing monomer in the cation-modified polyvinyl alcohol is 0.1 to 10 mol %, preferably 0.2 to 5 mol % with respect to vinyl acetate.

Examples of the anion-modified polyvinyl alcohol may include polyvinyl alcohols having an anionic group as those described in Japanese Patent Application Laid-Open No. 1-206088, copolymers of vinyl alcohol and vinyl compounds having a water-soluble group as those described in Japanese Patent Application Laid-Open Nos. 61-237681 and 63-307979, and modified polyvinyl alcohols having a water-soluble group as those described in Japanese Patent Application Laid-Open No. 7-285265.

Examples of nonionic-modified polyvinyl alcohols may include polyvinyl alcohol derivatives formed by adding a polyalkylene oxide group to a part of vinyl alcohol as those described in Japanese Patent Application Laid-Open No. 7-9758, block copolymers of vinyl compounds having a hydrophobic group and vinyl alcohol as those described in Japanese Patent Application Laid-Open No. 8-25795, and the like. Two or more kinds of polyvinyl alcohols having different polymerization degrees and kinds of modification can also be used in combination.

As the gelatin that can be applied to the present invention, acid-treated gelatins may also be used besides lime-treated gelatin, and hydrolysates of gelatin and enzymatically-decomposed products of gelatin can also be used. These water-swellable polymers may be used alone or in plural kinds.

Examples of the polysaccharide thickeners that can be used in the present invention may include generally-known natural simple polysaccharides, natural composite polysaccharides, synthetic simple polysaccharides and synthetic composite polysaccharides, and with respect to the details of these polysaccharides, "Encyclopedia of Biochemistry (second edition), published by Tokyo Kagaku Dojin", "Food Industry" Vol. 31 (1988), page 21, and the like can be referred to.

The polysaccharide thickeners as referred to in the present invention are polymers of saccharides having many hydrogen bond groups in the molecule, which have a property of the large difference between the viscosity at a low temperature and the viscosity at a high temperature due to the difference in the hydrogen bonding forces among the molecules depending on temperatures. When metal oxide microparticles are added, the polysaccharide thickeners cause increase in the viscosity at a low temperature which may be due to hydrogen bonding with the metal oxide microparticles. The range of the increase in viscosity of polysaccharide is such that the viscosity at 40° C. increases to 1.0 mPa·s or more by the addition, and the polysaccharides have an ability to increase the viscosity of preferably 5.0 mPa·s or more, further preferably 10.0 mPa·s or more.

Examples of the polysaccharide thickeners that can be applied to the present invention may include β1-4 glucan (for example, carboxymethyl cellulose, carboxyethyl cellulose and the like), galactans (for example, agarose, agaropectin and the like), galactomannoglycans (for example, locust bean gum, guaran and the like), xyloglucans (for example, tamarind gam and the like), glucomannoglycans (for example, konjac mannan, glucomannans from wood materials, xanthan gum or the like), galactoglucomannoglycans (for example, glycans from softwood materials), alabinogalactoglycans (for example, glycan from soybean, glycans derived from microorganisms and the like), glucorhamnoglycans (for example, gellan gum and the like), glycosaminoglycans (for example, hyaluronic acid, keratan sulfate and the like), natural polymer polysaccharides from red algae such as alginic acid and alginic acid salts, agar, κ-carrageenan, λ-carrageenan, ι-carrageenan and furcelleran, and the like. Polysaccharides in which constitutional units are free from carboxylic acid groups and sulfonic acid groups are preferable from the viewpoint that the dispersion stability of the metal oxide microparticles that are co-existing in the application liquid is not lowered. Such polysaccharides are preferably polysaccharides consisting of only pentoses such as L-arabitose, D-ribose, 2-deoxyribose and D-xylose, or polysaccharides consisting of hexoses such as D-glucose, D-fructose, D-mannose and D-galactose. Specifically, tamarind seed gum, which is known as a xyloglucan having glucose as a main chain and xylose as a side chain, guar gum, which is known as a galactomannan having mannose as a main chain and galactose as a side chain, locust bean gum, tara gum, and arabinogalactan having galactose as a main chain and arabinose as a side chain can be preferably used.

In the present invention, it is further preferable to use two or more kinds of polysaccharide thickeners in combination.

The content in each refractive index layer containing the polysaccharide thickeners is preferably 5% by mass or more and 50% by mass or less, more preferably 10% by mass or more and 40% by mass or less. However, in the case of combination use with a water-soluble polymer, an emulsion resin and the like, the polysaccharide thickeners may be contained by 3% by mass or more. When the polysaccharide thickeners are in a small amount, the film surface is disturbed during drying of coating, and the transparency tends to be deteriorated. On the other hand, when the content is 50% by mass or less, the relative content of the metal oxide is appropriate, and thus the difference in refractive indices of the high-refractive-index layer and low-refractive-index layer is easily increased.

[Curing Agent]

In the case where the water-soluble polymer, which is the second polymer, is used as the above-mentioned polymer, it is preferable to cure the water-soluble polymer by using a curing agent so as to fulfill a function as a binder.

Although the curing agent that can be applied to the present invention is not especially limited as long as it is a curing agent that causes a curing reaction with the water-soluble polymer, in the case where the water-soluble polymer is a polyvinyl alcohol, boric acid and salts thereof are preferable. Other known curing agents can be used, and the curing agent is generally a compound that has a group capable of reacting with the water-soluble polymer or a compound that promotes the reaction between the different groups that are possessed by the water-soluble polymer. The agent is suitably selected and used depending on the kind of the water-soluble polymer. Specific examples of the curing agent may include epoxy-based curing agents (diglycidyl ethyl ether, ethylene glycol diglycidyl ether, 1,4-butanediol diglycidyl ether, 1,6-diglycidylcyclohexane, N,N-diglycidyl-4-glycidyloxyaniline, sorbitolpolyglycidyl ether, glycerol polyglycidyl ether and the like), aldehyde-based curing agent (formaldehyde, glyoxal and the like), active halogen-based curing agents (2,4-dichloro-4-hydroxy-1,3,5-s-triazine and the like), active vinyl-based compounds (1,3,5-tris-acryloyl-hexahydro-s-triazine, bisvinylsulfonyl methyl ether and the like), aluminum alum and the like.

In the case where the water-soluble polymer is a gelatin, examples may include organic film hardening agents such as vinylsulfone compounds, urea-formalin condensates, melanine-formalin condensates, epoxy-based compounds, aziridine-based compounds, active olefins and isocyanate-based compounds, inorganic polyvalent metal salts of chromium, aluminum, zirconium and the like, and the like.

[Metal Oxide Particles]

In the present invention, the metal oxide particles are used in constituting the above-mentioned high-refractive-index layer or low-refractive-index layer. A combination of metal oxides that show a high refractive index and a low refractive index that are suitable for the infrared shielding film is selected. The combination is used together with the second polymer as the respective high-refractive-index material and low-refractive-index material.

Examples of the metal oxide particles used for such purpose may include particles of titanium dioxide, zirconium oxide, zinc oxide, synthetic amorphous silica, colloidal silica, alumina, colloidal alumina, lead titanate, red lead, chrome yellow, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon, tin oxide and the like.

Among the above-mentioned particles, it is preferable to use solid microparticles selected from titanium dioxide, zirconium oxide and zinc oxide as the high-refractive-index material, and it is preferable to use solid microparticles selected from silicon oxide (silica) and alumina as the low-refractive-index material.

The metal oxide microparticles are preferably in a state that a dispersion of the microparticles is dispersed to primary particles before being mixed with the water-soluble polymer.

The metal oxide microparticles each has a particle size of 100 nm or less, preferably 4 to 50 nm, more preferably 4 to 30 nm. For example, in the case of microparticle silica by a gas phase process, the average particle size of the primary particles of the metal oxide microparticles dispersed in the state of primary particles (the particle size in a disperse liquid state before application) is preferably 100 nm or less, more preferably 4 to 50 nm, and even more preferably 4 to 20 nm. In the case of colloidal silica, the preferable average particle size is generally 2 to 100 nm, and an average particle size of 3 to 30 nm is especially preferable. The preferable primary particle size of the titanium dioxide microparticles is a particle size of 4 to 50 nm, more preferably 4 to 30 nm.

The average particle size of the metal oxide microparticles is obtained by observing the particles themselves or the particles that are appeared on the cross-sectional surface or surface of the layer under an electron microscope, measuring the particle sizes of arbitrary 1,000 particles, and obtaining the average particle size as a simple average value (number average) of the particles. Meanwhile, the particle size of each particle is represented by a diameter of a circle that is equal to the projected area of the particle as assumption.

The content of the metal oxide particles in the high-refractive-index layer is preferably 20 to 80% by volume, more preferably 30 to 70% by volume with respect to the total mass of the high-refractive-index layer. The content of the metal oxide particles in the low-refractive-index layer is preferably 20 to 80% by volume, more preferably 30 to 70% by volume with respect to the total mass of the low-refractive-index layer. The content of the metal oxide particles in each layer can be obtained as a ratio to the whole amount of the solid content in the application liquid to form each layer in the production step.

(Silicon Dioxide and Alumina)

In the present invention, silicon dioxide and alumina can be used as the low-refractive-index material in the low-refractive-index layer. As silicon dioxide (silica), silica synthesized by a general wet process, colloidal silica or silica synthesized by a gas phase process or the like is preferably used, and as the microparticle silica that is especially preferably used in the present invention, microparticle silica synthesized by colloidal silica, especially an acidic colloidal silica sol or microparticle silica synthesized by a gas phase process is preferable. Among these, microparticle silica synthesized by a gas phase process is preferable since a coarse flocculated body is difficult to be formed when the microparticle silica is added to a cationic polymer. The alumina or alumina hydrate may be either crystalline or amorphous, and those having optional shapes such as amorphous particles, spherical shape particles and needle-like particle, can be used.

As the silica synthesized by a gas phase process in which the primary particles has an average particle size of 4 to 20 nm, which is even more preferably used, for example, Aerosil manufactured by Nippon Aerosil Co., Ltd. is commercially available. This gas phase-processed microparticle silica can be relatively easily dispersed to primary particles by, for example, aspiration dispersion of the microparticle silica in water by a jet stream inductor mixer manufactured by Mitamura Riken Kogyo Inc. or the like.

As the gas phase-processed microparticle silica that is currently commercially available, various Aerosils from Nippon Aerosil Co., Ltd. are appropriate.

The colloidal silica that is preferably used in the present invention is obtained by thermal aging of a silica sol that is obtained by double decomposition by an acid or the like of sodium silicate or passing of sodium silicate through an ion-exchange resin layer, and use of this colloidal silica for inkjet recording paper is described in, for example, Japanese Patent Application Laid-Open Nos. 57-14091, 60-219083, 60-219084, 61-20792, 61-188183, 63-17807, 4-93284, 5-278324, 6-92011, 6-183134, 6-297830, 7-81214, 7-101142, 7-179029 and 7-137431, and WO 94/26530, and the like.

The silica and colloidal silica synthesized by a gas phase process may be ones having cation-modified surfaces, or may be ones treated with Al, Ca, Mg and Ba, and the like.

In the present invention, a colloidal silica composite emulsion can also be used as the metal oxide in the low-refractive-index layer. The colloidal silica composite emulsion that is preferably used in the present invention is formed such that the center part of each particle is formed of a polymer or copolymer or the like as a main component, and can be obtained by polymerizing a monomer having an ethylenically unsaturated bond by a conventionally-known emulsification polymerization process under presence of colloidal silica described in Japanese Patent Application Laid-Open Nos. 59-71316 and 60-127371. The particle size of the colloidal silica that is applied to the composite emulsion is preferably lower than 40 nm.

The colloidal silica used for the preparation of this composite emulsion may include colloidal silica having primary particles of generally 2 to 100 nm. Examples of the ethylenic monomer may include materials that are known in the field of latex such as (meth)acrylic acid esters having an alkyl group, aryl group or allyl group with a carbon number of 1 to 18, styrene, α-methylstyrene, vinyltoluene, acrylonitrile, vinyl chloride, vinylidene chloride, vinyl acetate, vinyl propionate, acrylamide, N-methylolacrylamide, ethylene and butadiene. Where necessary, vinylsilanes such as vinyltrimethoxysilane, vinyltriethooxysilane and γ-metacryloxypropyltrimethoxysilane are used as auxiliary agents so as to further improve compatibility with colloidal silica, and anionic monomers such as (meth)acrylic acid, maleic acid, maleic anhydride, fumaric acid and crotonic acid are used as auxiliary agents to stabilize the dispersion of the emulsion. Where necessary, two or more kinds of ethylenic monomers can be used in combination.

More preferable colloidal silica composite emulsions used in the present invention may include those having a glass transition point in the range of −30 to 30° C.

Compositionally preferable ones may include ethylenic monomers such as acrylic acid esters and methacrylic acid esters, and especially preferable ones may include copolymers of (meth)acrylic acid esters and styrene, copolymers of (meth)acrylic acid alkyl esters and (meth)acrylic acid aralkyl esters, and copolymers of (meth)acrylic acid alkyl esters and (meth)acrylic acid aryl esters.

The ratio of the ethylenic monomer/colloidal silica in emulsification polymerization is preferably 100/1 to 200 by a solid content ratio.

Examples of the emulsifier used in emulsification polymerization may include sodium alkyl allyl polyether sulfonate salts, sodium lauryl sulfonate salt, sodium alkylbenzene sulfonate salts, sodium polyoxyethylene nonyl phenyl ether nitrate salt, sodium alkyl allyl sulfosuccinate salts, sodium sulfopropylmaleic acid monoalkyl ester salts and the like.

Preferable particle sizes are 10 nm or less for primary particles and 30 nm or less for secondary particles, and haze is small and visible light permeability is excellent.

(Titanium dioxide)

In the present invention, titanium dioxide is preferably used as the high-refractive-index material in the high-refractive-index layer. In view of the stability of the metal oxide particle-containing composition to form the high-refractive-index layer, $TiO_2$ (titanium dioxide sol) is more preferable. Furthermore, among $TiO_2$, a rutile type is especially more preferable than an anatase type, because the rutile type has low catalyst activity, and thus the weather resistances of the high-refractive-index layer and the adjacent layer are increased, and the rutile type also has a high refractive index. Hereinafter the process for the production of a rutile type titanium dioxide sol will be explained.

Process for Production of Titanium Dioxide Sol

The first step in the process for the production of a rutile type microparticle titanium dioxide is a step of treating titanium dioxide hydrate with at least one kind of basic compound selected from the group consisting of hydroxides of alkali metals and hydroxides of alkaline earth metals (Step 1).

The titanium dioxide hydrate can be obtained by hydrolyzing a water-soluble titanium compound such as titanium sulfate and titanium chloride. The process for the hydrolysis is not especially limited, and a known process can be applied. Among these, the titanium dioxide hydrate is preferably obtained by thermal hydrolysis of titanium sulfate.

The above-mentioned step (1) can be conducted by, for example, adding the above-mentioned basic compound to an aqueous suspension of the above-mentioned titanium dioxide hydrate, and treating the titanium dioxide hydrate (reacting) under a condition of a predetermined temperature for a predetermined time.

The process to form the above-mentioned titanium dioxide hydrate into an aqueous suspension is not especially limited, and can be conducted by adding the above-mentioned titanium dioxide hydrate to water and stirring. Although the concentration of the suspension is not especially limited, for example, it is preferably that the concentration of $TiO_2$ is 30 to 150 g/L in the suspension. By the concentration of the above-mentioned range, the reaction (treatment) can be efficiently progressed.

The at least one of basic compound selected from the group consisting of hydroxides of alkali metals and hydroxides of alkaline earth metal used in the above-mentioned step (1) is not especially limited, and may include sodium hydroxide, potassium hydroxide, magnesium hydroxide, calcium hydroxide and the like. The addition amount of the above-mentioned basic compound in the above-mentioned step (1) is preferably 30 to 300 g/L as the concentration of the basic compound in the reaction (treatment) suspension.

It is preferable that the above-mentioned step (1) is conducted at a reaction (treatment) temperature of 60 to 120° C. The reaction (treatment) time differs depending on the reaction (treatment) temperature, and is preferably 2 to 10 hours. The reaction (treatment) is preferably conducted by adding an aqueous solution of sodium hydroxide, potassium hydroxide, magnesium hydroxide or calcium hydroxide to a suspension of titanium dioxide hydrate. After the reaction (treatment), the reaction (treatment) mixture is cooled, neutralized with an inorganic acid such as hydrochloric acid if necessary, and washed, thereby microparticle titanium dioxide hydrate can be obtained.

As the second step (step (2)), the compound obtained by the step (1) may be treated with a carboxylic acid group-containing compound and an inorganic acid. In the production of the rutile type microparticle titanium dioxide, although the process to treat the compound obtained by the above-mentioned step (1) with the inorganic acid is a known process, the particle size can be adjusted by using the carboxylic acid group-containing compound in addition to the inorganic acid.

The above-mentioned carboxylic acid group-containing compound is an organic compound having a —COOH group. As the above-mentioned carboxylic acid group-containing compound, a polycarboxylic acid having two or more, more preferably 2 or more and 4 or less carboxylic acid groups, is preferable. Since the above-mentioned polycarboxylic acid has an ability to coordinate to a metal atom, it is understood that the polycarboxylic acid suppress the aggregation of the microparticles by the coordination, thereby a preferable rutile type microparticle titanium dioxide can be preferably obtained.

The above-mentioned carboxylic acid group-containing compound is not especially limited, and examples may include dicarboxylic acids such as oxalic acid, malonic acid, succinic acid, glutalic acid, adipic acid, propylmalonic acid and maleic acid; hydroxypolyvalent carboxylic acids such as malic acid, tartaric acid and citric acid; aromatic polycarboxylic acids such as phthalic acid, isophthalic acid, hemimellitic acid and trimellitic acid; ethylenediaminetetraacetate, and the like. Among these, two or more kinds of compounds may be simultaneously used.

Meanwhile, the entirety or a part of the above-mentioned carboxylic acid group-containing compound may be a neutralized product of an organic compound having a —COOH group (for example, organic compounds having a —COONa group, and the like).

The above-mentioned inorganic acid is not especially limited, and hydrochloric acid, sulfuric acid, nitric acid and the like can be exemplified. It is preferable that the above-mentioned inorganic acid is added so that the concentration in the liquid for the reaction (treatment) is 0.5 to 2.5 mol/L, more preferably 0.8 to 1.4 mol/L.

It is preferable that the above-mentioned step (2) is conducted by suspending the compound obtained by the above-mentioned step (1) in pure water, and heating under stirring as necessary. Although the carboxylic acid group-containing compound and inorganic acid may be added either at the same time or in sequence, it is preferable to add in sequence.

The addition may be carried out by adding the carboxylic acid group-containing compound and then adding the inorganic acid, or by adding the inorganic acid and then adding the carboxylic acid group-containing compound.

For example, some processes are exemplified: a process in which the carboxyl group-containing compound is added to the suspension of the compound obtained by the above-mentioned step (1), heating is started, the inorganic acid is added at the time when the liquid temperature reaches 60° C. or more, preferably 90° C. or more, and the mixture is stirred for preferably 15 minutes to 5 hours, more preferably 2 to 3 hours while maintaining the liquid temperature (Process 1); a process in which the suspension of the compound obtained by the above-mentioned step (1) is heated, the inorganic acid is added at the time when the liquid temperature reaches 60° C. or more, preferably 90° C. or more, the carboxylic acid group-containing compound is added at 10 to 15 minutes after the addition of the inorganic acid, and the mixture is stirred for preferably 15 minutes to 5 hours, more preferably 2 to 3 hours while maintaining the liquid temperature (Process 2), and the like. By those processes, a preferable microparticle-like rutile type titanium dioxide can be obtained.

In the case where the above-mentioned step (2) is conducted by the above-mentioned Process 1, the above-mentioned carboxylic acid group-containing compound is used by preferably a ratio of 0.25 to 1.5 mol %, more preferably by a ratio of 0.4 to 0.8 mol % with respect to 100 mol % of $TiO_2$. In the case where the addition amount of the carboxylic acid group-containing compound is less than 0.25 mol %, the particles grow excessively, and thus particles having an intended particle size may not be obtained. Whereas in the case where the addition amount of the carboxylic acid group-containing compound is more than 1.5 mol %, the rutilation of the particles does not proceed and thus anatase particles may be formed.

In the case where the above-mentioned step (2) is conducted by the above-mentioned Process 2, the above-mentioned carboxylic acid group-containing compound is used with preferably a ratio of 1.6 to 4.0 mol %, more preferably with a ratio of 2.0 to 2.4 mol % with respect to 100 mol % of $TiO_2$.

In the case where the addition amount of the carboxylic acid group-containing compound is less than 1.6 mol %, the particles grow excessively, and thus particles having an intended particle size may not be obtained, whereas in the case where the addition amount of the carboxylic acid group-containing compound is more than 4.0 mol %, the rutilation of the particles does not proceed and thus anatase particles may be formed. Therefore, even the addition amount of the carboxylic acid group-containing compound is more than 4.0 mol %, the effect is not fine and thus is economically disadvantageous. When the above-mentioned carboxylic acid group-containing compound is added at less than 10 minutes from the addition of the inorganic acid, the rutilation does not proceed and thus anatase particles may be formed. Whereas when the addition is conducted at more than 15 minutes from the addition of the inorganic acid, the particles excessively grow, and thus particles having an intended particle size may not be obtained.

In the above-mentioned step (2), it is preferable to conduct cooling after the completion of the reaction (treatment), and further conducting neutralization so as to provide pH 5.0 to pH 10.0. The above-mentioned neutralization can be conducted by an alkaline compound such as an aqueous sodium hydroxide solution and aqueous ammonia. By filtrating and washing with water after the neutralization, the intended rutile type microparticle titanium dioxide can be separated.

As the process for producing titanium dioxide microparticles, known processes described in "Titanium Oxide-Physical Properties and Applied Techniques" (Manabu Kiyono, pp 255 to 258 (2000), Gihodo Publishing Co., Ltd.) and the like can be used.

[Film Substrate]

As the film substrate (substrate) used in the present invention, various resin films can be used, and polyolefin films (polyethylene, polypropylene and the like), polyester films (polyethylene telephthalate, polyethylene naphthalate and the like), polyvinyl chloride, triacetate cellulose and the like can be used, and polyester films are preferable. Although the polyester films (hereinafter abbreviated as polyesters) are not especially limited, they are preferably polyesters containing a dicarboxylic acid component and a diol component as main components and having film formability. As the dicarboxylic acid component of the main components, telephthalic acid, isophthalic acid, phthalic acid, 2,6-naphthalenedicarboxylic acid, 2,7-naphthalenedicarboxylic acid, diphenylsulfonedicarboxylic acid, diphenyl etherdicarboxylic acid, diphenylethanedicarboxylic acid, cyclohexanedicarboxylic acid, diphenyldicarboxylic acid, diphenylthioether dicarboxylic acid, diphenylketone dicarboxylic acid, phenylindanedicarboxylic acid and the like can be exemplified. As diol component, ethylene glycol, propylene glycol, tetramethylene glycol, cyclohexanedimethanol, 2,2-bis(4-hydroxyphenyl) propane, 2,2-bis(4-hydroxyethoxyphenyl) propane, bis(4-hydroxyphenyl)sulfone, bisphenol fluorene dihydroxyethyl ether, diethylene glycol, neopentyl glycol, hydroquinone, cyclohexanediol and the like can be exemplified. Among the polyesters containing these as the main components, polyesters containing telephthalic acid or 2,6-naphthalenedicarboxylic acid as the dicarboxylic acid component and ethylene glycol or 1,4-cyclohexanedimethanol as diol component as main components are preferable from the viewpoints of transparency, mechanical strength, size stability and the like. Among these, polyesters containing polyethylene telephthalate or polyethylene naphthalate as main component, a copolymerized polyester formed of telephthalic acid, 2,6-naphthalenedicarboxylic acid and ethylene glycol, and polyesters containing a mixture of two or more kinds of those polyesters as main components are preferable.

It is preferable that the thickness of the film substrate used in the present invention is 10 to 300 μm, especially 20 to 150 μm. The film substrate of the present invention may be a stack of two sheets, and in this case, the kinds thereof may be the same or different.

[Amino Acid]

In the present invention, it is preferable to further add an amino acid so as to improve the dispersibility of the metal oxide.

The amino acid as referred to in the present invention is a compound having an amino group and a carboxyl group in one molecule and may be an amino acid of any type of α-, β-, γ- and the like, and an amino acid having an isoelectric point of 6.5 or less is preferable. Although some amino acids have optical isomers, there is no difference in the effect by the optical isomers in the present invention, and any isomers having an isoelectric point of 6.5 or less may be used alone or as a racemate.

For the detailed description relating to the amino acids that can be applied to the present invention, the description of Encyclopedia of Chemistry 1, reduced edition (Kyoritsu Shuppan Co., Ltd.; published on 1960), pages 268 to 270 can be referred to.

The preferable amino acids in the present invention may include glycine, alanine, valine, α-aminobutyric acid, γ-aminobutyric acid, β-alanine, serine, ε-amino-n-caproic acid, leucine, norleucine, phenylalanine, threonine, asparagine, aspartic acid, histidine, lysine, glutamine, cystein, methionine, proline, hydroxyproline and the like, and the solubility at the isolectric point is preferably 3 g or more with respect to 100 g of water so as to use as an aqueous solution. For example, glycine, alanine, serine, histidine, lysine, glutamine, cystein, methionine, proline, hydroxyproline and the like are preferably used, and it is further preferable to use serine and hydroxyproline, which have a hydroxyl group, from the viewpoint that the metal oxide particles have loose hydrogen bonds with a binder.

[Other Additives for Refractive Index Layers]

The high-refractive-index layer and low-refractive-index layer according to the present invention can contain various additives as necessary.

For example, the layers can contain known additives such as the ultraviolet absorbers described in Japanese Patent Application Laid-Open Nos. 57-74193, 57-87988 and 62-261476, the fading inhibitors described in Japanese Patent Application Laid-Open Nos. 57-74192, 57-87989, 60-72785, 61-146591, 1-95091 and 3-13376 and the like, various anionic, cationic or nonionic surfactants, the fluorescent brightening agents described in Japanese Patent Application Laid-Open Nos. 59-42993, 59-52689, 62-280069, 61-242871 and 4-219266 and the like, pH adjusting agents such as sulfuric acid, phosphoric acid, acetic acid, citric acid, sodium hydroxide, potassium hydroxide and potassium carbonate, defoaming agents, lubricants such as diethylene glycol, antiseptic agents, antistatic agents and mat agents.

[Process for Producing Infrared Shielding Film]

The production of the infrared shielding film of the present invention is divided into the case where the high-refractive-index layer and low-refractive-index layer are formed by using the first polymer, and the case where the high-refractive-index layer and low-refractive-index layer are formed by using the second polymer and metal oxide particles.

(In Case Where First Polymer is Used)

In the case where the first polymer is used, the polymer of the high-refractive-index material and the polymer of the lowly-refractive material can be stacked by using a melt extrusion process. For example, the polymers are melted at 220 to 290° C. so as to have suitable viscosities for extrusion, various additives are added as necessary, and the both polymers can be extruded by an extruder so as to give alternate two layers. Secondly, the extruded stacked film is transported by winding over several minutes by a cooling roll 1 having a surface temperature that is not less than the glass transition temperature and not more than the melt extrusion temperature (for example, 160° C.), a cooling roll 2 having a surface temperature that is not less than room temperature and not more than the surface temperature of the cooling roll 1 (for example, 100° C.), and a cooling roll 3 at not less than room temperature and not more than the surface temperature of the cooling roll 2 (for example, 60° C.) in this order, thereby the stacked film is solidified by cooling to give a stacked body. If the stacked film is solidified by cooling under such condition, the mixed region as mentioned above can be formed. Thereafter this stacked body is heated to a temperature of about 100 to 110° C. and drawn in two directions, thereby an infrared shielding film can be obtained.

(In Case where Second Polymer is Used)

In the case where the second polymer and metal oxide particles are used, an application liquid for the high-refractive-index layer and an application liquid for the low-refractive-index layer are firstly prepared, and those application liquids can be alternately-stacked by, for example, applying them onto a film substrate by aqueous simultaneous multi-layer application or multi-layer extrusion molding. Secondly, after the application of the application liquids, the application liquids are set (the stacked application liquids are once cooled) and dried, thereby the production can be finished. In this case, for example, when the high-refractive-index layer application liquid and the low-refractive-index layer application liquid are applied by simultaneous multi-layer application, the components of the respective application liquids (a high-refractive-index material and a low-refractive-index material) are mixed with each other within the time until the setting, and the high-refractive-index material and low-refractive-index material are consequently mixed at the boundary, thereby the mixed region in which the mixing ratio of the materials continuously changes is formed.

Hereinafter the process for the production of the infrared shielding film in the case where the second polymer is used will be explained with dividing the process into respective steps.

<Preparation of Application Liquid for High-Refractive-Index Layer and Application Liquid for Low-Refractive-Index Layer>

The processes for preparing the application liquid for the high-refractive-index layer and the application liquid for the low-refractive-index layer are not especially limited, and examples may include a process in which the second polymer and metal oxide particles, and other additives added as necessary, are added and mixed together with a solvent under stirring. The order of addition of the second polymer, metal oxide particles and other additives is not especially limited, and the respective components may be added in sequence and mixed under stirring or may be added at once and mixed under stirring. Where necessary, the viscosity is adjusted to a suitable one by further using a solvent.

<Solvent>

The solvent for preparing the application liquid for the high-refractive-index layer and the application liquid for the low-refractive-index layer is not especially limited, but water, organic solvents, or mixed solvents thereof are preferable.

Examples of the above-mentioned organic solvent may include alcohols such as methanol, ethanol, 2-propanol and 1-butanol, esters such as ethyl acetate, butyl acetate, propylene glycol monomethyl ether acetate and propylene glycol monoethyl ether acetate, ethers such as diethyl ether, propylene glycol monomethyl ether and ethylene glycol monoethyl ether, amides such as dimethylformamide and N-methylpyrrolidone, ketones such as acetone, methyl ethyl ketone, acetylacetone and cyclohexanone, and the like. These organic solvents may be used alone or by mixing two or more kinds.

From the viewpoints of environments, convenience of operations, and the like, water, or mixed solvents of water and methanol, ethanol or ethyl acetate are especially preferable as a solvents for the application liquids.

The concentration of the water-soluble polymer in the application liquid for the high-refractive-index layer is 0.3 to 4%, more preferably 0.35 to 3%. The concentration of the metal oxide particles in the application liquid for the high-refractive-index layer is preferably 2 to 50% by mass. The ratio of the metal oxide particles/water-soluble polymer (F/B) in the application liquid for the high-refractive-index layer is preferably 0.3 to 10, more preferably 0.5 to 5.

The concentration of the water-soluble polymer in the application liquid for the low-refractive-index layer is 0.3 to 4%, more preferably 0.35 to 3%. The concentration of the metal oxide particles in the application liquid for the low-refractive-index layer is preferably 2 to 50% by mass. The ratio of the metal oxide particles/water-soluble polymer (F/B) is preferably 0.3 to 10, more preferably 0.5 to 5.

As mentioned, a simultaneous multi-layer application process is preferable to produce the infrared shielding film of the present invention, and, when simultaneously multi-layer application is conducted by a slide bead application system (slide hopper application process), the viscosities of the application liquid for the high-refractive-index layer and application liquid for the low-refractive-index layer are preferably in the range of 5 to 100 mPa·s, more preferably in the range of 10 to 50 mPa·s. In the case where a curtain application system is used, the viscosities of the application liquid for the high-refractive-index layer and the application liquid for the low-refractive-index layer at 45° C. are preferably in the range of 5 to 1200 mPa·s, more preferably in the range of 18 to 500 mPa·s.

The viscosities of the application liquid for the high-refractive-index layer and the application liquid for the low-refractive-index layer at 15° C. are preferably 100 mPa·s or more, more preferably 100 to 30,000 mPa·s, further preferably 3,000 to 30,000 mPa·s, especially preferably 10,000 to 30,000 mPa·s.

(Production Process by Multi-Layer Application)

The stacked body having the mixed region of the present invention can be fabricated by multi-layer application or multi-layer extrusion molding by using the application liquid for the high-refractive-index layer and the application liquid for the low-refractive-index layer produced as above. For example, when the high-refractive-index layer application liquid and the low-refractive-index layer application liquid are applied by simultaneous multi-layer application, the constitutional components of the respective application liquids (the high-refractive-index material and low-refractive-index material) are mixed with each other within the time until the setting, and the high-refractive-index material and low-refractive-index material are consequently mixed at the boundary, thereby the mixed region in which the mixing ratio of the materials continuously changes is formed.

As the application system for the simultaneous multi-layer application, for example, a roll coating process, a rod bar coating process, an air knife coating process, a spray coating process, a curtain application process, or a slide bead application process using a hopper described in U.S. Pat. Nos. 2,761,419 and 2,761,791, an extrusion coating process and the like are preferably used.

In order to form a stacked body having a continuous refractive index distribution by multi-layer application, the mass ratio of the above-mentioned second polymer and the metal oxide particles (F/B) in the application liquids for the respective layer is preferably in the range of 0.3 to 10, more preferably 0.5 to 5.

It is preferable to take the time from the above-mentioned simultaneous multi-layer application of the above-mentioned high-refractive-index layer and low-refractive-index layer to the sol-gel transition and setting to be within 10 minutes, more preferably within 65 minutes, and further preferably within 2 minutes. It is preferable to take a time of 45 seconds or more. In the case where the setting is conducted by blowing cool air as mentioned below, the time until setting as used herein refers to the time from the start of blowing with cool air to the solidifying of the surfaces of the applied layers. In the present invention, if the time until setting is lower than 45 seconds, the applied layers solidify rapidly, and thus the high-refractive-index layer and low-refractive-index layer are difficult to be mixed and the desired mixed region is difficult to be formed. On the other hand, if the time until setting is long, more than 6 minutes, the applied layers sets solidify slowly, and thus the high-refractive-index layer and low-refractive-index layer are extensively mixed and a difference in refractive indices required for an infrared shielding film may not be obtained.

In the case where the ratio of the optical film thicknesses is A 1/3, B 1/6 and C 1/3 as mentioned above, i.e., when the largest refractive index−the smallest refractive index=Δn, the stacked film has the refractive index profile such that the position where the refractive index is the largest refractive index−Δn/3 with respect to the largest refractive index is within the range of 0.9/3 to 1.1/3 from the largest refractive index point with respect to the width from the largest refractive index to the smallest refractive index layer thickness, and such that, for the smallest refractive index, the position where the smallest refractive index+Δn/3 is within the range of 0.9/3 to 1.1/3 from the smallest refractive index point with respect to the width from the largest refractive index to the smallest refractive index (layer thickness). If the time until setting is too short, preferable mixing of the components does not arise. If the setting time is long, the mixing of the layers proceeds and thus the required difference in refractive indices cannot be obtained.

The setting time can be adjusted by adjusting the viscosity by the concentration of the metal oxide microparticles, other components, or the like, or by adjusting the mass ratio of the binder or by adding and adjusting various known gelling agents such as gelatin, pectin, agar, carrageenan and gellan gum, or the like.

The setting as used herein means, for example, a step of increasing the viscosity of the coating composition by a means such as decreasing the temperature by blowing the coating with cool air or the like, thereby the substance fluidity between the layers and in each layer decrease. The time from the application to the setting specifically refers to the time, from when the surface of the applied film is blown with cool air of 5 to 10° C., to when the surface is pressed by a finger and no substance attaches to the finger.

The temperature condition when cool air is used is preferably a condition that the film surface is preferably 25° C. or less, and is further preferably 17° C. or less. The time for which the applied film is exposed to cool air depends on the velocity of application and transportation, and is preferably 10 seconds or more and 300 seconds or less, more preferably 100 seconds or more and 170 seconds or less.

As the processes for the application and drying, it is preferable to warm the application liquid to 30° C. or more, apply, and then set the formed coating as mentioned above and dry the coating at 10° C. or more. It is more preferable to dry under conditions that a wet bulb temperature is in the range of 5 to 85° C. and a film surface temperature is in the range of 10 to 85° C. as the conditions for the drying. The cooling system immediately after the application is preferably conducted by a horizontal set system in view of homogeneousness of the formed coating.

[Infrared Shielding Film]

It is preferable that the infrared shielding film of the present invention is produced as mentioned above, and that the optical film thickness and unit thereof are designed so that the infrared shielding film has a transmittance in the visible light region shown by JIS R3106-1998 of 50% or more, and has a reflectivity region of more than 40% in the wavelengths of 900 nm to 1400 nm.

In general, in an infrared shielding film, the infrared region among the incident spectra of direct solar light relates to the raising of indoor temperature, and the raising of indoor temperature can be suppressed by shielding this. When the accumulated energy ratio from the shortest wavelength (760 nm) to the longest wavelength 3200 nm of infrared ray is estimated based on the weighting coefficients described in Japanese Industrial Standards JIS R3106. When the total energy in the whole infrared region from the wavelength of 760 nm to the longest wavelength of 3200 nm is deemed to be 100, the accumulated energy from 760 nm to the respective wavelengths is estimated, then, the sum of energy from 760 nm to 1300 nm account for about 75% of the entirety of the infrared region. Therefore, it is the most efficient in an energy-saving effect by shielding heat ray to shield the wavelength region up to 1300 nm.

When the reflectivity in the near infrared region (760 to 1300 nm) is about 80% or more at the largest peak value, decrease in a sensory temperature can be obtained by a sensory evaluation. For example, a clear difference appeared on a sensory temperature near a southeastward window in the morning in August, when the reflectivity in the near infrared region is shielded up to about 80% at the largest peak value.

A multi-layer film structure that is required for such function is obtained by optical simulation (FTG Software Associates Film DESIGN Version 2.23. 3700), and consequently found that an excellent property can be obtained in the case where high-refractive-index of 1.9 or more, desirably 2.0 or more of high-refractive-index layer is utilized and six or more layers are stacked. For example, when a simulation result on a model in which 8 layers of high-refractive-index layers and low-refractive-index layers (refractive index=1.35) are alternately-stacked is referred to, the reflectivity does not reach 70% when the refractive index of the high-refractive-index layer is 1.8, whereas when the refractive index is 1.9, a reflectivity of about 80% can be obtained. In a model in which high-refractive-index layers (refractive index=2.2) and low-refractive-index layers (refractive index=1.35) are alternately stacked, the reflectivity does not reach 60% when the number of stacking is 4, whereas a reflectivity of about 80% can be obtained when the number of stacking is 6.

Accordingly, the wavelength of the reflected light can be controlled by changing the stacking constitution. Therefore, for the unit in which the above-mentioned high-refractive-index layers and low-refractive-index layers are alternately stacked, the range of the reflected lights is broaden by providing a constitution in which plural units of the high-refractive-index layer and low-refractive-index layer having different optical film thicknesses each other are stacked. Thereby, an infrared shielding film that reflects not only near infrared ray but also a part of the infrared or visible light region can be formed.

[Infrared Absorbing Layer or Infrared Reflective Layer]

The infrared shielding film of the present invention may further have an infrared absorbing layer or an infrared reflective layer. As mentioned above, the infrared shielding film of the present invention can effectively reflect light in the near infrared region, but a function to absorb or reflect light in the infrared region can also be imparted according to the intended use. Although the infrared absorbing layer or infrared reflective layer exerts the function as long as one layer is included in the stacked body of the infrared shielding film of the present invention, plural layers may be disposed. The infrared absorbing layer or infrared reflective layer may be disposed on any position in the stacked body of the infrared shielding film, but when the convenience of the production steps is taken into consideration, it is preferable to dispose the layer directly on a substrate, and to dispose the above-mentioned stacked unit of the above-mentioned high-refractive-index layer, mixed region and low-refractive-index layer.

As a light absorbing substance that absorb lights other than light in the near infrared reflection band, especially infrared ray, the following metal oxides can be used. Specifically, tin oxide, indium oxide, zinc oxide, cadmium oxide, antimony-doped tin oxide (ATO), fluorine-doped tin oxide (PTO), tin-doped indium oxide (ITO) and aluminum-doped zinc oxide (AZO) can be preferably used, and ATO and ITO are especially preferable.

Examples of infrared absorbing materials of organic substances may include polymethine-based, phthalocyanine-based, naphthalocyanine-based, metal complex-based, aminium-based, imonium-based, diimonium-based, anthraquinone-based, dithiol metal complex-based, naphthoquinone-based, indolephenol-based, azo-based and triallylmethane-based compounds, and the like. Metal complex-based compound, aminium-based compounds (aminium derivatives), phthalocyanine-based compounds (phthalocyanine derivatives), naphthalocyanine-based compounds (naphthalocyanine derivatives), diimonium-based compounds (diimonium derivatives), squalium-based compounds (squalium derivatives) and the like are especially preferably used.

Infrared ray reflective materials may include metal particles of aluminum, silver, copper, platinum, palladium and the like, or alloy particles thereof and metal oxide particles thereof.

In order to form the infrared absorbing layer or infrared reflective layer, in the cases of inorganic materials among the above-mentioned infrared absorbing materials or infrared reflective materials, deposition processes such as sputtering can be used. Furthermore, in the cases of organic materials, the organic materials can be dispersed together with a binder resin in a medium such as an organic solvent and stacked by application.

[Infrared Shielding Body]

The infrared shielding film of the present invention can be applied to a wide range of fields. Therefore, the present invention also provides infrared shielding bodies by attaching the infrared shielding film of the present invention to various articles that need to be protected from infrared ray. For example, the infrared shielding film is used as: a film for window such as a heat ray reflective film that imparts a heat ray reflection effect by being attached to an equipment (substrate) that is exposed to solar light for a long time period such as an exterior window of a building and an automobile window; an agricultural film for a vinyl greenhouse, for the purpose of mainly increasing weather resistance. An infrared shielding body in which the infrared shielding film according to the present invention is attached to a substrate such as a glass or a resin as a substitute for a glass, directly or through an adhesive, is preferable.

When the adhesive is attached to a window glass or the like, the window is installed so that a near infrared reflection film is disposed on the side of a solar light (heat ray) incident plane. When the near infrared reflection film is interposed between a window glass and a substrate, the near infrared reflection film can be sealed against surrounding gas such as moisture, and this is preferable for durability. It is also preferable to install the near infrared reflection film of the present invention out of doors or outside of a car (for external attachment) since environmental durability is provided.

As the adhesive that can be applied to the present invention, an adhesive containing a photocurable or thermosetting resin as a main component can be used.

The adhesive is preferably an adhesive having durability against ultraviolet ray, and acrylic-based pressure-sensitive adhesives or silicone-based pressure-sensitive adhesives are preferable. In view of tackiness and costs, acrylic-based pressure-sensitive adhesives are preferable. In acrylic-based pressure-sensitive adhesives, among solvent-based and emulsion-based acrylic-based pressure-sensitive adhesives, solvent-based acrylic-based pressure-sensitive adhesives are especially preferable because the peeling strength is easily controlled. In the case where a solution-polymerized polymer is used as acrylic-based solvent-based pressure-sensitive adhesive, known monomers can be used as the monomers therefor.

A polyvinyl butyral-based resin that is used as an intermediate layer for a laminated glass, or an ethylene-vinyl acetate copolymer-based resin may be used. Specific examples are plastic polyvinyl butyrals [manufactured by Sekisui Chemical Co., Ltd., manufactured by Mitsubishi Monsanto, and the like], ethylene-vinyl acetate copolymers [manufactured by Du Pont, Duramin manufactured by Takeda Pharmaceutical Company Ltd.], modified ethylene-vinyl acetate copolymers [Melthene G manufactured by Tosoh Corporation] and the like. Meanwhile, an ultraviolet absorber, an antioxidant, an antistatic agent, a heat stabilizer, a lubricant, a filler, a coloring, an adhesion controlling agent and the like may be suitably added to and incorporated into the adhesion layer.

EXAMPLES

Hereinafter the present invention will be specifically explained by Examples, but the present invention is not construed to be limited by Examples. In Examples, the indication "part(s)" or "%" is used, and unless otherwise indicated, the indication represents "part(s) by mass" or "% by mass".

Example 1

(Preparation of Low Refractive Index Application Liquid)

30 parts of 4%-by-mass aqueous solution of polyvinyl alcohol (PVA103, manufactured by Kuraray Co., Ltd., saponification degree: 98.0 to 99.0 mol %, polymerization degree: 300) and 150 parts of 3%-by-mass aqueous solution of boric acid were respectively mixed with 650 parts of 10%-by-mass aqueous solution of colloidal silica (Snowtex OXS manufactured by Nissan Chemical Industries, Ltd.; particle size: 4 to 6 nm) and added with pure water so as to be 1000 parts to thereof to prepare a silicon oxide dispersion L1.

Secondly, the above-mentioned dispersion 1 was heated to 45° C., and 750 parts of 4%-by-mass aqueous solution of polyvinyl alcohol (PVA-235, manufactured by Kuraray Co., Ltd., saponification degree: 87.0 to 89.0 mol %, polymerization degree: 3500) was added thereto under stirring, and 40 parts of 1%-by-mass aqueous solution of an anionic surfactant (Rapisol A30 manufactured by NOF Corporation) was then added, to thereby prepare a low-refractive-index layer application liquid. The application liquid for a low-refractive-index layer had a viscosity of 30 mPa·s (30 cP) at 45° C.

(Preparation of High Refractive Index Application Liquid)

30 L (liter) of an aqueous sodium hydroxide solution (concentration: 10 mol/L) was added to 10 L of an aqueous suspension containing titanium dioxide hydrate suspended in water ($TiO_2$ concentration: 100 g/L) under stirring, the temperature was raised to 90° C., and the solution was aged for 5 hours, neutralized with hydrochloric acid, filtrated and washed with water. Meanwhile, in the above-mentioned treatment, titanium dioxide hydrate obtained by thermal hydrolysis of an aqueous titanium sulfate solution according to a known means was used.

The base-treated titanium compound was suspended in pure water so that the $TiO_2$ concentration was 20 g/L, and citric acid was added by 0.4 mol % with respect to the amount of $TiO_2$ under stirring, and the temperature was raised. At the time when the liquid temperature reached 90° C., concentrated hydrochloric acid was added so that the hydrochloric acid concentration was 30 g/L, and stirring was conducted for 3 hours while the liquid temperature was maintained.

When pH and the zeta potential of the obtained titanium oxide sol liquid were measured, pH was 1.4, and the zeta potential was +40 mV. When a particle size was measured by using Zetasizer Nano manufactured by Malvern, the average particle size was 35 nm, and the monodispersity was 16%. The titanium oxide sol liquid was dried at 105° C. for 3 hours to give a particulate powder body, and X-ray diffraction was measured by using Type JDX-3530 manufactured by JEOL Datum) to confirm that the particulate powder body was rutile type particles. The volume average particle size was 10 nm.

4 kg of pure water was added to 1 kg of 20.0%-by-mass aqueous dispersion of titanium oxide sol containing rutile type titanium oxide microparticles having a volume average particle size of 10 nm.

[Preparation of Aqueous Silicic Acid Solution]

An aqueous silicic acid solution having a $SiO_2$ concentration of 2.0% by mass was prepared.

[Titanium oxide particles]

2 kg of pure water was added to 0.5 kg of the above-mentioned 10.0%-by-mass titanium oxide sol aqueous dispersion, and heated to 90° C. 1.3 kg of the aqueous silicic acid solution was then gradually added, a heat treatment is then conducted in an autoclave at 175° C. for 18 hours, and the product was further concentrated to obtain 20% by mass of particles of titanium oxide having a rutile type structure and $SiO_2$ as a coating layer.

28.9 parts of the 20.0%-by-mass sol aqueous dispersion of titanium oxide particles obtained above, 10.5 parts of 1.92%-by-mass aqueous citric acid solution, 2.0 parts of 10%-by-mass aqueous solution of polyvinyl alcohol (PVA103, manufactured by Kuraray Corporation) and 9.0 parts of 3%-by-mass aqueous boric acid solution were mixed to prepare a dispersion of titanium oxide particles.

Subsequently, 41.9 parts of 4.0%-by-mass aqueous solution pf polyvinyl alcohol (PVA235, manufactured by Kuraray Corporation) was added to 16.3 parts of pure water while the titanium oxide dispersion was stirred. Furthermore, 0.5 part of 1%-by-mass aqueous solution of an anionic surfactant (Rapisol A30 manufactured by NOF Corporation) was added, and the mixture was added with pure water so as to be 150 parts to thereby prepare a high-refractive-index layer application liquid. The application liquid for a high-refractive-index layer had a viscosity of 20 mPa·s (20 cP) at 45° C.

(Preparation of Stacked Body 1)

Using a slide hopper application apparatus capable of simultaneous application of 24 layers, simultaneous multi-layer application was conducted while retaining the temperature at 45° C. on a polyethylene telephthalate (PET) film having a thickness of 50 μm (A4300 manufactured by Toyobo Co., Ltd.: double-faced easy adhesive layer) as a film substrate by applying the low-refractive-index layer application liquid and high-refractive-index layer application liquid prepared above so as to alternately provide 24 layers in total, of which 12 layers are low-refractive-index layers and 12 layers are high-refractive-index layer, respectively. Immediately after that, the layers were set by blowing with cool air for 5 minutes under the condition in which the film surface was 15° C. or less and dried by blowing with hot air of 80° C. to form stacked body 1 formed of 24 layers. The film thicknesses of the high-refractive-index layer, mixed regions and low-refractive-index layer were confirmed based on a metal oxide concentration profile as mentioned below.

Example 2

(Preparation of Stacked Body 2)

An ITO film was formed as an infrared absorbing layer on a polycarbonate substrate by an RF magnetron sputtering apparatus (L-2505-FH manufactured by Anelva Corporation) with using argon gas as a sputtering atmosphere gas and presetting the ultimate pressure to $3.0 \times 10^{-3}$ Pa and the sputtering pressure to 0.65 Pa. As a target, an ITO sintered compact was used.

A stacked film was formed on the rear surface thereof in the same process as the preparation of the stacked body 1 to thereby prepare stacked body 2.

Example 3

(Preparation of Stacked Body 3)

Stacked body 4 was prepared in the same manner except that the titanium oxide in Example 1 was changed to alumina (Alumina Sol 520, manufactured by Nissan Chemical Industry Ltd., solid content: 20%), and the polyvinyl alcohol was changed to gelatin (HBC-P20, manufactured by Nitta Gelatin Inc., weight average molecular weight: 20,000).

Example 4

(Preparation of Stacked Body 4)

Stacked body 4 was prepared in the same manner except that the titanium oxide in Example 1 was changed to zirconia oxide microparticles (NanoUse ZR-30BF, manufactured by Nissan Chemical Industry Ltd., solid content: 300).

Example 5

(Preparation of Stacked Body 5)

A melted product of PMMA and a melted product of PET (about 285° C.) were extruded by using a feed block of an extruder so that the two layers were superposed in an alternate manner and developed on a die. Next, the extruded stacked film was gradually solidified for several minutes by cooling with the use of a plurality of cooling drums by being transported while being tightly-attached to cooling drum 1 in which the surface temperature was retained at 160° C., then cooling drum 2 in which the surface temperature was retained at 100° C., and cooling drum 3 being retained at 60° C. This undrawn film was heated at 110° C. and drawn in two directions to prepare stacked body 5.

Comparative Example 1

(Preparation of Stacked Body 6)

Target materials for Ti and Si were put into a vacuum chamber, oxygen was fed as reaction gas, and an alternately-stacked film of $TiO_2$ and $SiO_2$ was formed on a polycarbonate substrate by a well-known sputtering process. During the film formation, the thickness of the generated film was monitored by a film thickness detection means, the target was switched at the timepoint when the $TiO_2$ layer had a film thickness of 84 nm or the $SiO_2$ layer had a film thickness of 155 nm. This was repeated 24 times to prepare stacked body 6.

Comparative Example 2

(Preparation of Stacked Body 7)

Stacked body 7 was obtained by the same manner except that a mixed region in which the two materials were mixed was formed by providing a time for simultaneous sputtering of Ti and Si when switching the target in the process for the preparation of the stacked body 6.

Comparative Example 3

(Preparation of Stacked Body 8)

Stacked body 8 was obtained in the same manner except that the applied coating was set within a short time by blowing with cool air of 5° C. with a doubled air volume for 90 seconds in the process for the preparation of the stacked body 4.

[Evaluation]

(σ/ΔAv)

Figure 2:
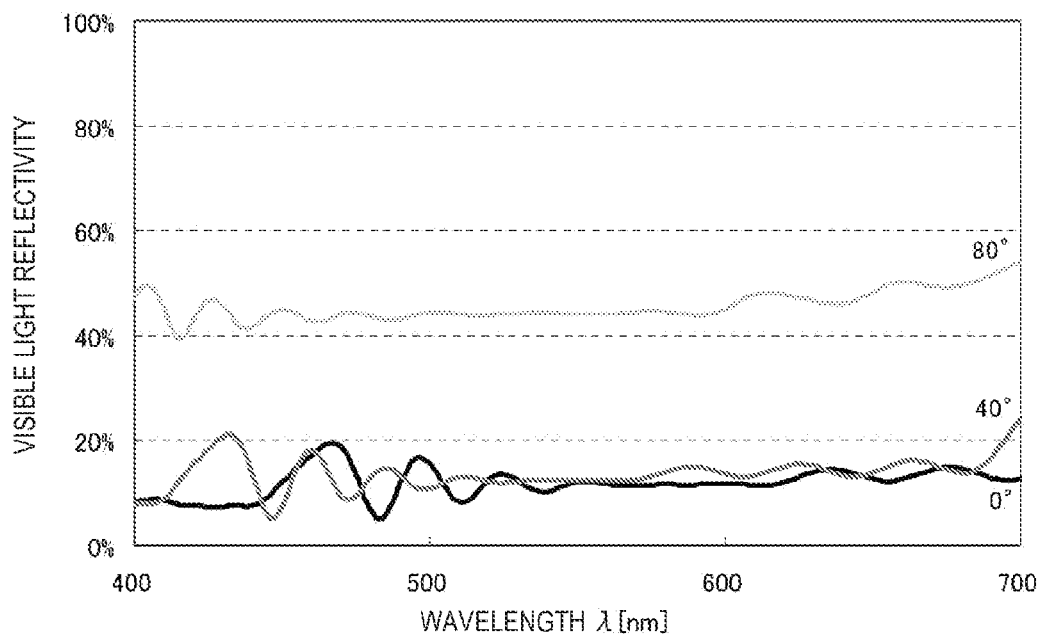
FIG. 2 is a drawing showing the visible light reflection characteristic of the infrared shielding film of Example 1.

For the stacked bodies 1 to 8 of Examples 1 to 5 and Comparative Examples 1 to 3, a 5° reflection unit was attached to a spectrometer (Type U-4000 manufactured by Hitachi, Ltd.), and the reflectivity was measured for the side of the stacked surface as a measurement surface. As an example, the reflection spectrum of the stacked body 1 (Example 1) is shown in FIG. 1. A high reflection peak appears in the vicinity of wavelengths of 800 nm to 1100 nm, and this indicates that a performance as an infrared shielding film is expressed. The reflection spectrum in the visible light wavelength region is shown in FIG. 2. It is understood that the increase and decrease in reflectivity are small in either of the light incident angles 0°, 40° and 80° and no characteristic peak appears. Namely, the unevenness in reflection characteristic is small.

Figure 3:
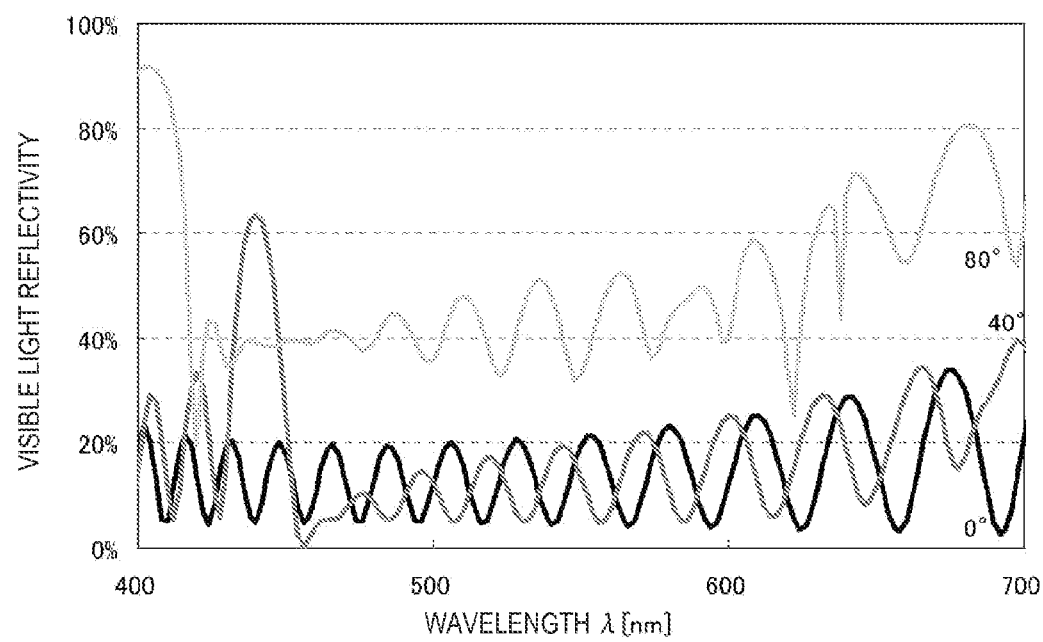
FIG. 3 is a drawing showing the visible light reflection characteristic of the infrared shielding film of Comparative Example 1.

On the other hand, the visible light reflection spectrum of the stacked body 6 (Comparative Example 1) is shown in FIG. 3. It is understand that the increase and decrease in the reflectivity is significant as the incident angle increases.

Here, the visible light average reflectivity Av was calculated by measuring the reflectivities on 151 points at intervals of 2 nm in the region of 400 to 700 nm, summing up all of the obtained reflectivities, and dividing the obtained value by 151. The unevenness of the reflectivities σ was calculated as a standard deviation of the differences from the average reflectivity Av on the respective points. The difference obtained by subtracting a light incident angle of 0° from Av for light ray at a light incident angle of 80° was referred as ΔAv, and σ/ΔAv was regarded as an index value of the reflection unevenness in the visible light region, which is shown in Table 1. In Examples, it was confirmed that the value of σ/ΔAv satisfied the range of 0.01≤σ/ΔAv≤0.12.

(Calculation of Refractive Indices)

A subject layer for a measurement of refractive index (the high-refractive-index layer and low-refractive-index layer) was applied as a single layer so as to be a film thickness of 1 μm on a substrate of a polyethylene telephthalate (PET) film having a thickness of 50 μm (A4300 manufactured by Toyobo Co., Ltd.: double-faced easy adhesion layer) to thereby prepare a film-formed body for the measurement of refractive index. The spectroscopic reflectivities of this film-formed body were measured by a spectrometer (Type U-4000, manufactured by Hitachi, Ltd.), and the refractive indices of the respective layers were calculated. The calculated difference Δn between the refractive indices of the refractive index of the high-refractive-index layer and the refractive index of the low-refractive-index layer is shown in Table 1.

For the layer containing a metal oxide, a metal oxide concentration profile was measured in the film thickness direction of the stacked body by using a XPS surface analyzer (ESCALAB-200R manufactured by VG Scientifics). Using this measurement result, the refractive index profile in the film thickness direction was derived. For the layer containing no metal oxide, a carbon atom concentration profile was measured by a XPS surface analyzer, and the refractive index profile was derived.

Figure 4:
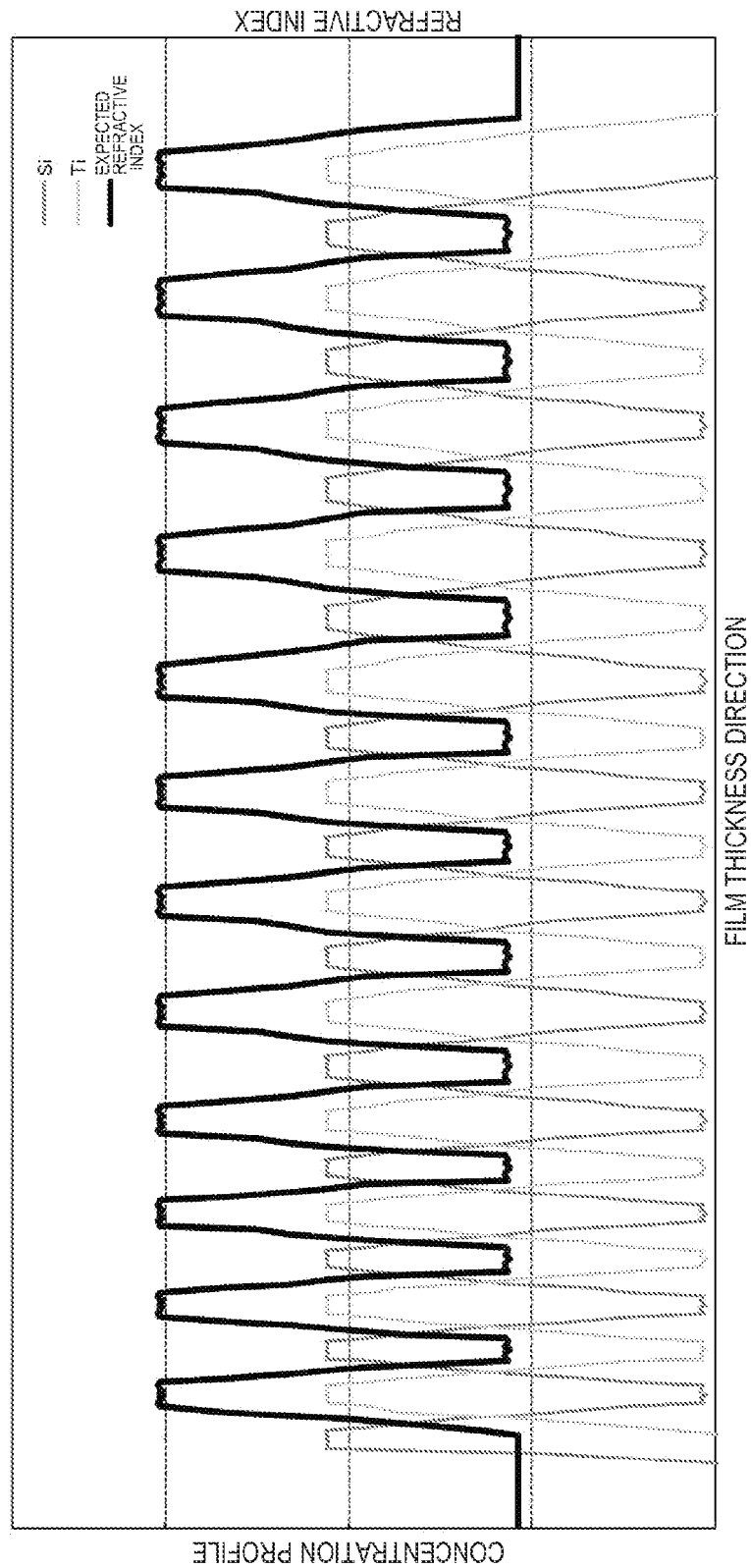
FIG. 4 is a drawing showing the metal oxide concentration and refractive index profile in the film thickness direction of the infrared shielding film of Example 1.

As a typical derived refractive index profile, the metal oxide concentration profile and derived refractive index profile of the stacked body 1 (Example 1) are shown in FIG. 4 as schematic drawings. The refractive index profile shows that the change in refractive index continuously arises.

For the stacked bodies 1 to 8, based on each refractive index profile and Δn, an optional layer in the stacked body was selected and it was confirmed that: for the largest refractive index, whether or not the position where the refractive index was the largest refractive index−Δn/3 was within the range of 0.9/3 to 1.1/3 from the largest refractive index point with respect to the width from the largest refractive index to the smallest refractive index (layer thickness), and for the smallest refractive index, whether or not the position where the smallest refractive index+Δn/3 was within the range of 0.9/3 to 1.1/3 from the smallest refractive index point with respect to the width from the largest refractive index to the smallest refractive index (layer thickness). As a result thereof, it was confirmed that the stacked bodies 1 to 5 and 7 to 8 (Examples 1 to 5 and Comparative Examples 2 to 3) satisfied the above-mentioned conditions and had continuously changed refractive index profiles. On the other hand, the stacked body 6 (Comparative Example 1) did not satisfy the above-mentioned conditions, and it was impossible to say that the refractive index profile continuously changed.

Based on the refractive index profiles derived by this process, when the region where the concentration of the constitutional components of high-refractive-index layer accounts for 80% or more was referred as a high-refractive-index layer, the region where the concentration of the low refractive index constitutional components accounts for 80% or more was regarded as a low-refractive-index layer, and the region where both of the constitutional components are lower than 80% was set as a mixed region, the film thickness of the high-refractive-index layer of the stacked body 1 was 40 nm, the film thickness of the low-refractive-index layer was 42 nm, and the thickness of the mixed region was 127 nm on average for the seven regions, 116 nm on average for the eight regions, and 107 nm on average for the eight regions, from the side close to the substrate.

Figure 5:
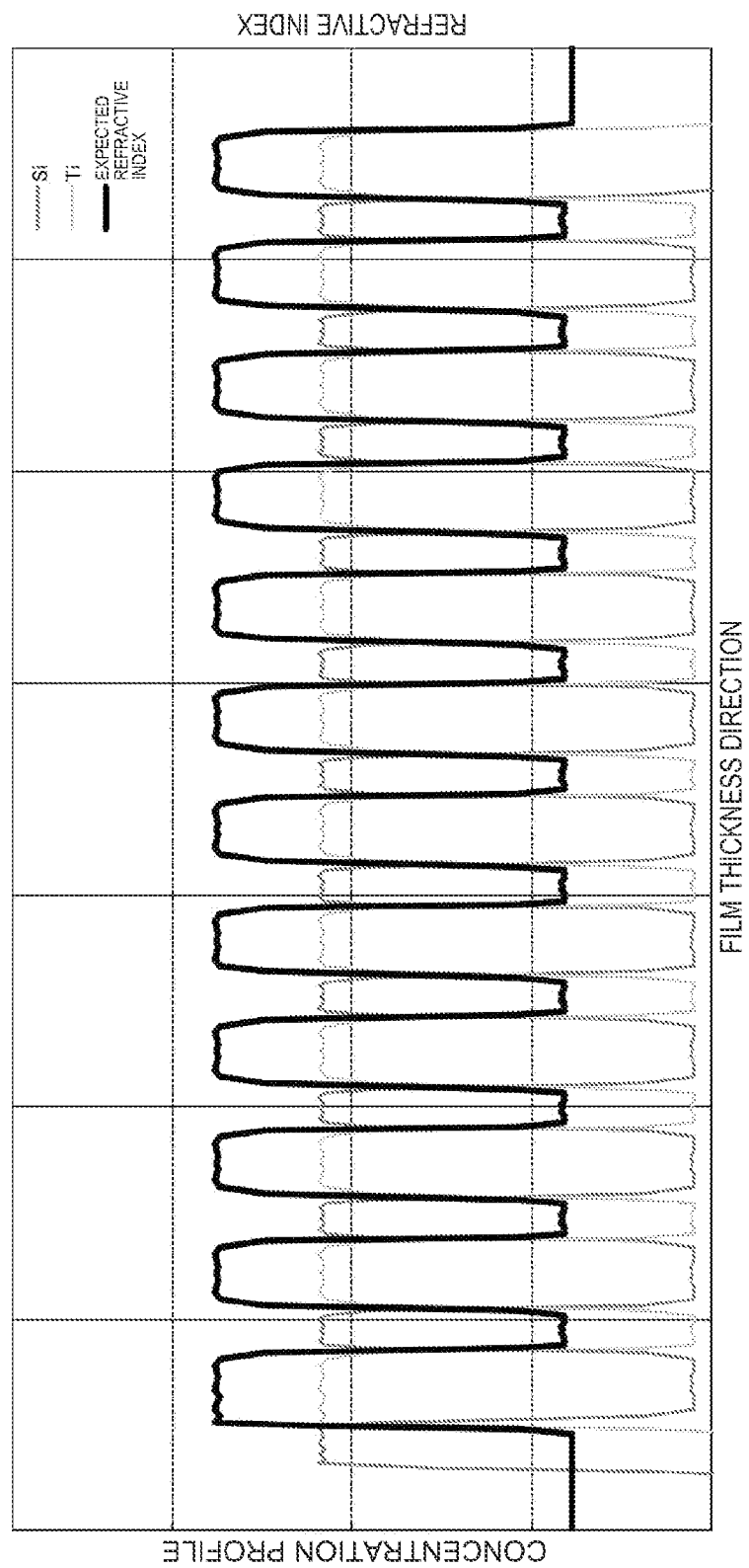
FIG. 5 is a drawing showing the metal oxide concentration and refractive index profile in the film thickness direction of the infrared shielding film of Comparative Example 1.

Similarly, the metal oxide concentration profile and derived refractive index profile of the stacked body 6 having no mixed region (Comparative Example 1) are shown in FIG. 5. The refractive index profile is rectangular, and a significant difference in refractive indices arises at the boundary of the layers. The film thickness of the high-refractive-index layer of the stacked body 6 was 84 nm, the film thickness of the low-refractive-index layer was 155 nm, and no mixed region was present.

(Degree of Change in Solar Heat Gain Coefficient)

For the stacked bodies 1 to 8 prepared in the respective Examples and Comparative Examples, in order to evaluate the properties as infrared shielding films, the solar heat gain coefficients at wavelengths of 760 nm to 1300 nm were calculated from spectroscopic reflectivity spectra measured based on the wavelength dispersion of solar beam. The solar heat gain coefficients were calculated based on JIS R 3106 (Processes for testing transmittance, reflectivity, emissivity and solar heat gain coefficient of plate glasses).

For each of Examples and Comparative Examples, stacked bodies in which the film thicknesses of the all layers (respective layers) were respectively increased by 5%, increased by 10% and increased by 20%, were prepared, and the same calculation was conducted. These values were compared, and the degrees of change in solar heat gain coefficient of the stacked bodies of Examples 1 to 5 or Comparative Examples 1 to 3 in the respective film thickness errors were evaluated as follows.

⊙: 2% or less
○: more than 2% and 4% or less
Δ: more than 4% and 7% or less
X: more than 7%

The degree was within 5% in either of Examples, and thus it can be said that it was possible to form infrared shielding films having highly robust reflection performances with respect to film thickness error. Being highly robust with respect to film thickness error (error during production) leads to the increase in the yield ratio in mass production, and thus the producibility is improved.

Furthermore, the stacked bodies 1 to 8 were each put into a thermo-hygrostat bath that had been preset to a temperature of 70° C. and a humidity of 65% for 40 hours. Thereafter the reflectivity was measured again by a spectrometer, and the solar heat gain coefficient was calculated. The degree of change of the solar heat gain coefficient after putting into the thermo-hygrostat bath with respect to the solar heat gain coefficient before putting into the thermo-hygrostat bath was evaluated by ⊙ to X, which are similar to those mentioned above. This result shows that the decrease in performance is small against the change in film thickness over time in the stacked bodies 1 to 5, which are Examples.

Especially, Examples 1 to 3 provided results of excellent degrees of change in solar heat gain coefficient as compared to Examples 4 to 5. Although the details is not clear, it is understood that the results are due to the balance between small σ/ΔAv (the variation in reflectivity in the visible light region is small) and large Δn (a high performance can be expressed even by a small number of stacking).

(Color Unevenness)

The side on which the stacked body had not been applied of the substrate was rubbed with steel wool, and the surface thereof was colored with a black spray coating material and thoroughly dried to thereby prepare a rear surface black color-treated body. The degree of color unevenness when this rear surface black color-treated body was visually observed from the side on which the stacked body had been applied in a dark room under fluorescent light was evaluated. The evaluation criteria were as follows.

○: Color unevenness was not observed
Δ: Slight color unevenness was observed
X: Color unevenness was significant

TABLE 1

| | Constitutional materials<br>Upper column: high-refractive index layer<br>Lower column: low-refractive index layer | Number of layers | Presence or absence of mixed region | Process of constitution | Δn | σ/ΔAv<br>Upper column: incident angle 0°<br>Middle column: incident angle 40°<br>Lower column: incident angle 80° | Degree of change in solar heat gain coefficient | | | After weather resistance test | Color unevenness |
|---|---|---|---|---|---|---|---|---|---|---|---|
| | | | | | | | Film thickness +5% | Film thickness +10% | Film thickness +20% | | |
| Example 1 | TiO$_2$ + PVA<br>SiO$_2$ + PVA | 24 layers | Present | Multi-layer application | 0.45 | 0.09<br>0.11<br>0.10 | ⊙ | ⊙ | Δ | ⊙ | ○ |
| Example 2 | TiO$_2$ + PVA<br>SiO$_2$ + PVA<br>Infrared absorbing layer (ITO) | 24 layers | Present | Multi-layer application | 0.45 | 0.05<br>0.06<br>0.07 | ⊙ | ⊙ | ○ | ⊙ | ○ |
| Example 3 | Al$_2$O$_3$ + gelatin<br>SiO$_2$ + gelatin | 24 layers | Present | Multi-layer application | 0.25 | 0.05<br>0.05<br>0.06 | ⊙ | ⊙ | ○ | ○ | ○ |
| Example 4 | ZrO + PVA<br>SiO2 + PVA | 24 layers | Present | Multi-layer application | 0.29 | 0.06<br>0.07<br>0.07 | ○ | ○ | ○ | ○ | Δ |
| Example 5 | PET<br>PMMA | 100 layers | Present | Melt extrusion | 0.16 | 0.05<br>0.04<br>0.09 | ○ | Δ | Δ | Δ | ○ |
| Comparative Example 1 | TiO$_2$<br>SiO$_2$ | 24 layers | Absent | Sputtering | 1.2 | 0.26<br>0.50<br>0.53 | Δ | X | X | X | X |
| Comparative Example 2 | TiO$_2$<br>SiO$_2$ | 24 layers | Present | Sputtering | 1.2 | 1.32<br>1.21<br>0.55 | ○ | Δ | X | X | Δ |
| Comparative Example 3 | ZrO2 + PVA<br>SiO2 + PVA | 24 layers | Present | Multi-layer application | 0.29 | 0.22<br>0.28<br>0.14 | Δ | X | Δ | X | X |

What is claimed is:

1. An infrared shielding film having at least one unit formed by stacking a high-refractive-index layer and a low-refractive-index layer, the layers containing a high-refractive-index material and a low-refractive-index material, respectively, the materials having different refractive indices with each other, wherein
   the high-refractive-index layer and the low-refractive-index layer each contains at least one polymer, the infrared shielding film has a mixed region containing the high-refractive-index material and the low-refractive-index material between the high-refractive-index layer and the low-refractive-index layer, the mixing ratio of the high-refractive-index material and the low-refractive-index material continuously changes in the mixed region, and the infrared shielding film satisfies a following formula (1) in a visible light wavelength region and at light incident angles of 0°, 40° and 80°:

$$0.01 \leq \sigma/\Delta Av \leq 0.12 \tag{1}$$

wherein σ represents a variation in reflectivity, and ΔAv represents an amount of variation of average reflectivity.

2. The infrared shielding film according to claim 1, wherein the at least one unit mainly reflects near infrared light.

3. The infrared shielding film according to claim 1, wherein the film further has an infrared absorbing layer or an infrared reflective layer.

4. The infrared shielding film according to claim 1, wherein the difference between the refractive index of the high-refractive-index layer and the refractive index of the low-refractive-index layer Δn is 0.05 to 0.65.

5. The infrared shielding film according to claim 1, wherein at least one of the polymers is a water-soluble polymer, and at least one of the high-refractive-index layer and low-refractive-index layer which contains the water-soluble polymer further contains metal oxide particles.

6. A method for making the infrared shield film of claim 1 comprising the steps of:
   preparing a low refractive index application liquid comprising water, a first metal oxide and a polymer;
   preparing a high refractive index application liquid comprising water, a second metal oxide and a polymer;
   applying the low refractive index application liquid and the high refractive index application liquid alternating onto a substrate to form a plurality of alternating layers on the substrate;
   cooling the formed plurality of alternating layers on the substrate; and
   drying the cooled formed plurality of alternating layers on the substrate to form the infrared shield film of claim 1.

7. A method for making the infrared shield film of claim 1, comprising the steps of:
   preparing a first melted product comprising a polymer having a first refractive index;
   preparing a second melted product comprising a polymer having a second refractive index, the second refractive index different than the first refractive index;
   extruding the first melted product and the second melted product alternatively to form a stacked film of alternating layers of the first melted product and the second melted product;
   cooling the stacked film; and
   heating and drawing the cooled stacked film to form the infrared shield film of claim 1.

* * * * *